US012802347B2

(12) United States Patent
Fei et al.

(10) Patent No.: US 12,802,347 B2
(45) Date of Patent: Nov. 17, 2026

(54) MAP DATA PROCESSING METHOD AND APPARATUS

(71) Applicant: Yinwang Intelligent Technologies Co., Ltd., Shenzhen (CN)

(72) Inventors: Wenkai Fei, Beijing (CN); Jianqin Liu, Beijing (CN); Yong Wu, Beijing (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 18/609,305

(22) Filed: Mar. 19, 2024

(65) Prior Publication Data

US 2024/0221294 A1 Jul. 4, 2024

Related U.S. Application Data

(63) Continuation of application No. PCT/CN2022/117432, filed on Sep. 7, 2022.

(30) Foreign Application Priority Data

Sep. 19, 2021 (CN) ......................... 202111127585.X

(51) Int. Cl.
*G06T 15/60* (2006.01)
*G01C 21/00* (2006.01)
(Continued)

(52) U.S. Cl.
CPC ............ *G06T 15/60* (2013.01); *G01C 21/367* (2013.01); *G01C 21/3826* (2020.08); *G06T 7/50* (2017.01);
(Continued)

(58) Field of Classification Search
CPC ............ G01C 21/3438; G01C 21/3461; G01C 21/367; G01C 21/3804; G01C 21/3826;
(Continued)

(56) References Cited

U.S. PATENT DOCUMENTS

| | | | | |
|---|---|---|---|---|
| 9,734,722 | B1 * | 8/2017 | Markey .................. | G01C 21/20 |
| 2002/0123841 | A1 | 9/2002 | Satoh et al. | |

(Continued)

FOREIGN PATENT DOCUMENTS

| | | | |
|---|---|---|---|
| CN | 102445213 | A | 5/2012 |
| CN | 109657336 | A | 4/2019 |

(Continued)

OTHER PUBLICATIONS

ZHAO Yongtao et al., Early warning method for driving safety based on CUDA, Jan. 10, 2017, total 10 pages.

*Primary Examiner* — Ming Wu

(74) *Attorney, Agent, or Firm* — Conley Rose, P.C.

(57) ABSTRACT

A map data processing method adds, to a map, a new type of map information, namely, shadow information that describes a shadow region, where content indicated by the shadow information and a data organization form in the map such that the map can record at least one of a geographical location, a shape, a size, a shadow degree, a reliability degree, a formation cause, and a change with time of the shadow region.

20 Claims, 24 Drawing Sheets

(51) Int. Cl.

| | |
|---|---|
| ***G01C 21/36*** | (2006.01) |
| ***G06T 7/50*** | (2017.01) |
| ***G06T 7/62*** | (2017.01) |
| ***G06T 7/73*** | (2017.01) |

(52) U.S. Cl.
CPC .................. *G06T 7/62* (2017.01); *G06T 7/73* (2017.01); *G06T 2207/20092* (2013.01); *G06T 2207/30181* (2013.01)

(58) Field of Classification Search
CPC ..................... G06F 16/29; G06T 15/60; G06T 2207/20092; G06T 2207/30181; G06T 7/50; G06T 7/62; G06T 7/73
See application file for complete search history.

(56) References Cited

U.S. PATENT DOCUMENTS

| | | | | |
|---|---|---|---|---|
| 2007/0006098 | A1* | 1/2007 | Krumm .................. | H04W 4/18 715/825 |
| 2011/0234631 | A1* | 9/2011 | Kim ........................ | G06T 15/60 345/632 |
| 2015/0105108 | A1 | 4/2015 | Lee | |
| 2019/0382001 | A1 | 12/2019 | Chelian | |
| 2020/0035004 | A1 | 1/2020 | Sameer | |
| 2021/0105340 | A1* | 4/2021 | Grozdanov ........... | G06F 40/166 |

FOREIGN PATENT DOCUMENTS

| | | | |
|---|---|---|---|
| CN | 110794848 | A | 2/2020 |
| CN | 111422128 | A | 7/2020 |
| CN | 112927336 | A | 6/2021 |
| CN | 113364990 | A | 9/2021 |
| EP | 2498059 | A1 | 9/2012 |
| JP | 2005258107 | A | 9/2005 |
| JP | 2009032181 | A | 2/2009 |
| JP | 2013020288 | A | 1/2013 |
| JP | 2021026387 | A | 2/2021 |

* cited by examiner

MAP DATA PROCESSING METHOD AND APPARATUS

CROSS-REFERENCE TO RELATED APPLICATIONS

This is a continuation of International Patent Application No. PCT/CN2022/117432 filed on Sep. 7, 2022, which claims priority to Chinese Patent Application No. 202111127585.X filed on Sep. 19, 2021. The disclosures of the aforementioned applications are hereby incorporated by reference in their entireties.

TECHNICAL FIELD

This disclosure relates to the field of electronic map technologies, and in particular, to a map data processing method and apparatus.

BACKGROUND

As intelligent driving includes increasingly high accuracy of a sensing system and a decision-making system of a vehicle, an electronic map, as a carrier of traffic information, can provide prior reference information such as a road topology for the vehicle. In particular, a rapidly developing high-definition (HD) map, also referred to as a high-resolution map or a high-precision map, greatly improves precision and real-time performance of information. The high-definition map improves accuracy of sensing and decision-making of the vehicle through map positioning and perception and fusion, and also provides beyond-line-of-sight traffic information for the vehicle to make a forward-looking prediction.

Future intelligent driving and intelligent transportation pose higher requirements on richness of map information. However, richness of existing map content cannot fully meet future use requirements.

SUMMARY

To solve a technical problem in the conventional technology that richness of map content cannot fully meet a use requirement, embodiments of this disclosure provide a map data processing method and apparatus.

According to a first aspect, a map data processing method is provided. The method may be executed by, for example, a map generation device, a server, a vehicle, a portable terminal, or an application. The method includes obtaining shadow information, where the shadow information indicates a shadow region, the shadow information includes location information, and the location information indicates a geographical location of the shadow region, and storing the shadow information as map data. The shadow region is a surface region whose intensity of receiving light is weaker than that of a surrounding region. For example, the shadow region may be a surface region covered by a shadow of a nearby building, a surface region covered by a ceiling, a tunnel region, or a surface region covered by a leaf spot under a lush tree.

Optionally, the location information is expressed based on coordinates or a map element.

Optionally, the shadow information further includes an identifier of the shadow region, to facilitate maintenance of the shadow information on a map.

In this embodiment of this disclosure, a new type of map bearing content, that is, the shadow information used to indicate the shadow region, is introduced into the map, so that the map can provide prior information or real-time information of the shadow region for a user, to greatly improve richness of map content and meet more map use requirements of the user.

According to the first aspect, in a possible implementation of the map data processing method, obtaining shadow information includes generating the shadow information. Further, statistics may be collected on sensing data obtained by a map collection vehicle, a crowd-sourcing vehicle, or a roadside device, and the shadow information may be generated with reference to other information such as a weather condition.

According to any one of the first aspect or the possible implementations of the first aspect, in still another possible implementation of the map data processing method, obtaining shadow information includes receiving the shadow information. Receiving the shadow information includes receiving the shadow information from another device, component, chip, interface, hardware module, or software module.

According to any one of the first aspect or the possible implementations of the first aspect, in still another possible implementation of the map data processing method, the shadow information further includes at least one of geometric information, time information, shadow degree information, confidence level information, and cause information. The geometric information indicates a shape or a size of the shadow region. The time information indicates a time period in which the shadow region exists. The shadow degree information indicates a shadow degree of the shadow region. The confidence level information indicates a reliability degree of the shadow region. The cause information indicates a cause of generating the shadow region.

Optionally, the time information includes at least one of a year field, a quarter field, a month field, a date field, an hour field, a minute field, and a timestamp.

Optionally, the shadow degree includes at least one of an average illumination intensity value of the shadow region, an illumination intensity difference between the shadow region and a non-shadow region, a picture luminance difference between the shadow region and the non-shadow region, a picture contrast between the shadow region and the non-shadow region, and a shadow degree.

Optionally, the confidence level information is determined based on at least one of the following factors: a weather condition, a reliability degree of a collection device, a reliability degree of a collection manner, and an amount of statistical data.

Optionally, the shadow information may include at least one of the foregoing plurality of types of information as dynamic information on the map.

Optionally, the shadow information may include at least one of the foregoing plurality of types of information as static information on the map.

According to any one of the first aspect or the possible implementations of the first aspect, in still another possible implementation of the map data processing method, storing the shadow information as map data includes storing the shadow information in a data structure for storing an event in the map.

Optionally, the shadow information is stored in a unit of a tile, and each tile includes a plurality of pieces of shadow information that indicate a plurality of shadow regions.

According to any one of the first aspect or the possible implementations of the first aspect, in still another possible implementation of the map data processing method, the method further includes sending the shadow information.

According to any one of the first aspect or the possible implementations of the first aspect, in still another possible implementation of the map data processing method, the method further includes displaying or controlling display of the shadow region based on the shadow information.

Optionally, displaying the shadow region based on the shadow information includes receiving a shadow display trigger instruction entered by a user, and superimposing, based on the shadow display trigger instruction, the shadow information on other information of the map for display or controlling display.

Optionally, a display region corresponding to the shadow region has a different grayscale, color, saturation, or superimposed pattern relative to another display region.

Optionally, when the shadow information further includes the time information, the time information indicates the time period in which the shadow region exists, and displaying the shadow region based on the shadow information includes displaying or controlling display of a change of the shadow region with time based on the time information.

Optionally, when the shadow information further includes the shadow degree information, the shadow degree information indicates the shadow degree of the shadow region, and displaying or controlling display of the shadow region based on the shadow information includes displaying or controlling display of the shadow degree information by using different grayscales, colors, saturation, or pattern densities.

Optionally, when the shadow information further includes the cause information, the cause information indicates the cause of generating the shadow region, and displaying the shadow region based on the shadow information includes displaying or controlling display of the cause information by using different grayscales, colors, saturation, or pattern densities.

Optionally, displaying or controlling display of the shadow region based on the shadow information includes determining a display region of the shadow region on a display interface based on the location information and boundary information of a map element in the map, and displaying or controlling display of the shadow region on the display region. When the map element is a road, the display region is a section of the road. When the map element is a lane, the display region is a section of the lane.

According to any one of the first aspect or the possible implementations of the first aspect, in still another possible implementation of the map data processing method, the method further includes obtaining sensing data about a target object, and identifying the target object based on the sensing data and the shadow information.

Optionally, identifying the target object includes identifying a category of the target object, a name of the target object, an outline of the target object, a color of the target object, a pattern of the target object, or whether the target object is stereoscopic.

Optionally, obtaining sensing data about a target object includes receiving the sensing data from a vehicle. The method further includes sending target indication information to the vehicle, where the target indication information indicates whether the target object exists or indicates a feature of the target object. Further, optionally, the feature includes a category of the target object, a name of the target object, an outline of the target object, a color of the target object, a pattern of the target object, or an attribute of whether the target object is stereoscopic.

Optionally, obtaining sensing data about a target object includes obtaining the sensing data obtained by a sensing device through sensing. The method further includes making a driving decision based on an identification result. Further, optionally, the sensing device includes a camera, a millimeter wave radar, a light detection and ranging (lidar), or a millimeter wave radar.

According to any one of the first aspect or the foregoing possible implementations of the first aspect, in still another possible implementation of the map data processing method, the method further includes obtaining driving data of a vehicle, where the driving data indicates a driving location of the vehicle, and determining, based on the driving data and the shadow information, that the vehicle is about to enter the shadow region within a time less than a first threshold, or that a distance between the vehicle and the shadow region in front of a driving direction of the vehicle is less than a second threshold.

Optionally, obtaining driving data of a vehicle includes receiving the driving data from the vehicle. The method further includes sending a reminder message to the vehicle, where the reminder message indicates that the vehicle is about to enter the shadow region.

Optionally, the method further includes reminding the user to perform at least one of the following operations: decelerating, turning on a headlight, turning on a warning light, and honking a horn.

Optionally, the method further includes controlling the vehicle to perform at least one of the following operations: decelerating, turning on a headlight, turning on a warning light, and honking a horn.

According to any one of the first aspect or the foregoing possible implementations of the first aspect, in still another possible implementation of the map data processing method, the method further includes obtaining parking requirement information of the user, where the parking requirement information indicates at least one of an estimated parking region, a parking start time, a parking end time, and parking duration, and selecting at least one parking space based on the parking requirement information and the shadow information.

Optionally, obtaining parking requirement information of the user includes receiving the parking requirement information from a mobile terminal.

Optionally, the method further includes sending parking space recommendation information to the mobile terminal, where the parking space recommendation information indicates the at least one parking space. The mobile terminal includes but is not limited to a vehicle or a portable terminal (such as a mobile phone, a tablet, or a navigator).

Optionally, obtaining parking requirement information of the user includes obtaining the parking requirement information based on an input of the user, or obtaining the parking requirement information based on navigation information.

Optionally, the method further includes recommending the parking space to the user on the display interface.

According to any one of the first aspect or the foregoing possible implementations of the first aspect, in still another possible implementation of the map data processing method, the method further includes obtaining travel information of the user, and planning a travel route or a pick-up location for the user based on the travel information and the shadow information.

Optionally, obtaining travel information of the user includes receiving the travel information from the mobile terminal.

Optionally, the method further includes sending travel suggestion information to the mobile terminal, where the travel suggestion information indicates the travel route or the pick-up location. The mobile terminal includes but is not limited to a vehicle or a portable terminal (such as a mobile phone, a tablet, or a navigator).

Optionally, the travel information includes at least one of a travel time, a travel mode (walking, cycling, or driving), a departure point, and a destination.

Optionally, the travel route is a route with a longest length of a road section covered by a shadow region, or a route with a largest ratio of a length of a road section covered by a shadow region to a total length of a road, or a route with a shortest length of a road section covered by a non-shadow region, or a route with a smallest ratio of a length of a road section covered by a non-shadow region to a total length of a road.

Optionally, the method further includes recommending the travel route to the user on the display interface.

According to any one of the first aspect or the possible implementations of the first aspect, in still another possible implementation of the map data processing method, the method further includes obtaining solar energy charging requirement information of the user, and determining, based on the solar energy charging requirement information and the shadow information, a first location for charging in a stationary state or a first route for charging in a moving state.

Optionally, obtaining solar energy charging requirement information of the user includes receiving the solar energy charging requirement information of the user from the mobile terminal.

Optionally, the method further includes sending solar energy charging indication information to the mobile terminal, where the solar energy charging indication information indicates the first location or the first route. The mobile terminal includes but is not limited to a vehicle or a portable terminal (such as a mobile phone, a tablet, or a navigator).

Optionally, the solar energy charging requirement information includes at least one of a charging location region, a charging start time, a charging end time, and charging duration.

Optionally, the method further includes recommending the first location or the first route to the user on the display interface.

According to any one of the first aspect or the possible implementations of the first aspect, in still another possible implementation of the map data processing method, the method further includes determining, based on the shadow information, at least one of a location, brightness, and hue used for laser projection.

Optionally, the shadow information further includes the time information, and the time information indicates the time period in which the shadow region exists.

Optionally, the method further includes determining, based on the shadow information, a time for the laser projection.

According to a second aspect, a map data processing apparatus is provided. The map data processing apparatus includes a first obtaining unit configured to obtain shadow information, where the shadow information indicates a shadow region, the shadow information includes location information, and the location information indicates a geographical location of the shadow region, and a storage unit configured to store the shadow information as map data.

Optionally, the location information is expressed based on coordinates or a map element.

Optionally, the shadow information further includes an identifier of the shadow region.

According to the second aspect, in a possible implementation of the map data processing apparatus, the first obtaining unit is a first processing unit configured to generate the shadow information.

According to any one of the second aspect or the possible implementations of the second aspect, in still another possible implementation of the map data processing apparatus, the first obtaining unit is a first receiving unit configured to receive the shadow information.

Optionally, the first processing unit is configured to collect statistics on sensing data obtained by a map collection vehicle, a crowd-sourcing vehicle, or a roadside device, and generate the shadow information with reference to other information such as a weather condition.

Optionally, the first receiving unit is configured to receive the shadow information from another device, a component, a chip, an interface, a hardware module, or a software module.

According to any one of the second aspect or the possible implementations of the second aspect, in still another possible implementation of the map data processing apparatus, the shadow information further includes at least one of geometric information, time information, shadow degree information, confidence level information, and cause information. The geometric information indicates a shape or a size of the shadow region. The time information indicates a time period in which the shadow region exists. The shadow degree information indicates a shadow degree of the shadow region. The confidence level information indicates a reliability degree of the shadow region. The cause information indicates a cause of generating the shadow region.

Optionally, the time information includes at least one of a year field, a quarter field, a month field, a date field, an hour field, a minute field, and a timestamp.

Optionally, the shadow degree includes at least one of an average illumination intensity value of the shadow region, an illumination intensity difference between the shadow region and a non-shadow region, a picture luminance difference between the shadow region and the non-shadow region, a picture contrast between the shadow region and the non-shadow region, and a shadow degree.

Optionally, the confidence level information is determined based on at least one of the following factors: a weather condition, a reliability degree of a collection device, a reliability degree of a collection manner, and an amount of statistical data.

According to any one of the second aspect or the possible implementations of the second aspect, in still another possible implementation of the map data processing apparatus, the storage unit is further configured to store the shadow information in a data structure for storing an event in a map.

Optionally, the shadow information is stored in a unit of a tile, and each tile includes a plurality of pieces of shadow information that indicate a plurality of shadow regions.

According to any one of the second aspect or the possible implementations of the second aspect, in still another possible implementation of the map data processing apparatus, the apparatus further includes a first sending unit configured to send the shadow information.

According to any one of the second aspect or the possible implementations of the second aspect, in still another possible implementation of the map data processing apparatus, the apparatus further includes a display unit configured to display the shadow region based on the shadow information. Alternatively, the display unit is independent of the apparatus, and the apparatus further includes a control unit configured to control display of the shadow region based on the shadow information.

According to any one of the second aspect or the possible implementations of the second aspect, in still another possible implementation of the map data processing apparatus, the apparatus further includes an input unit configured to receive a shadow display trigger instruction input by a user. When the input unit is independent of the apparatus, the apparatus further includes a receiving unit configured to receive a shadow display trigger instruction input by a user.

Optionally, the display unit superimposes, based on the shadow display trigger instruction, the shadow information on other information of the map for display. Alternatively, the control unit controls display of the shadow region based on the shadow display trigger instruction According to any one of the second aspect or the possible implementations of the second aspect, in still another possible implementation of the map data processing apparatus, a display region corresponding to the shadow region has a different grayscale, color, saturation or superimposed pattern with respect to another display region.

According to any one of the second aspect or the possible implementations of the second aspect, in still another possible implementation of the map data processing apparatus, the shadow information further includes the time information, and the time information indicates the time period in which the shadow region exists.

Optionally, the display unit is configured to display a change of the shadow region with time based on the time information. Alternatively, the control unit is configured to control display of a change of the shadow region with time based on the time information.

According to any one of the second aspect or the possible implementations of the second aspect, in still another possible implementation of the map data processing apparatus, the shadow information further includes the shadow degree information, and the shadow degree information indicates the shadow degree of the shadow region.

Optionally, the display unit is configured to display the shadow degree information by using different grayscales, colors, saturation, or pattern densities. Alternatively, the control unit is configured to control display of the shadow degree information by using different grayscales, colors, saturation, or pattern densities.

According to any one of the second aspect or the possible implementations of the second aspect, in still another possible implementation of the map data processing apparatus, the shadow information further includes the cause information, and the cause information indicates the cause of generating the shadow region.

Optionally, the display unit is configured to display the cause information by using different grayscales, colors, saturation, or pattern densities. Alternatively, the control unit is configured to control display of the cause information by using different grayscales, colors, saturation, or pattern densities.

According to any one of the second aspect or the possible implementations of the second aspect, in still another possible implementation of the map data processing apparatus, the apparatus further includes a second processing unit configured to determine a display region of the shadow region on a display interface based on the location information and boundary information of a map element in the map, and the display unit is configured to display the shadow region on the display region, or the control unit is configured to control display of the shadow region on the display region. When the map element is a road, the display region is a section of the road. When the map element is a lane, the display region is a section of the lane.

According to any one of the second aspect or the possible implementations of the second aspect, in still another possible implementation of the map data processing apparatus, the apparatus further includes a second obtaining unit configured to obtain sensing data about a target object, and a third processing unit configured to identify the target object based on the sensing data and the shadow information.

Optionally, the third processing unit identifies a category of the target object, a name of the target object, an outline of the target object, a color of the target object, a pattern of the target object, or whether the target object is stereoscopic.

Optionally, the second obtaining unit is a second receiving unit configured to receive the sensing data from a vehicle.

Optionally, the apparatus further includes a second sending unit configured to send target indication information to the vehicle, where the target indication information indicates an attribute of the target object.

Optionally, the attribute includes a category of the target object, a name of the target object, an outline of the target object, a color of the target object, a pattern of the target object, or whether the target object is stereoscopic.

Optionally, the second obtaining unit is configured to obtain the sensing data obtained by a sensing device through sensing. The third processing unit is configured to make a driving decision based on an identification result.

Optionally, the sensing device includes a camera, a millimeter wave radar, a lidar, or a millimeter wave radar.

According to any one of the second aspect or the possible implementations of the second aspect, in still another possible implementation of the map data processing apparatus, the apparatus further includes a third obtaining unit configured to obtain driving data of the vehicle, where the driving data indicates a driving location of the vehicle, and a fourth processing unit configured to determine, based on the driving data and the shadow information, that the vehicle is about to enter the shadow region within a time less than a first threshold, or that a distance between the vehicle and the shadow region in front of a driving direction of the vehicle is less than a second threshold.

Optionally, the third obtaining unit is a third receiving unit configured to receive the sensing data from the vehicle.

Optionally, the apparatus further includes a third sending unit configured to send a reminder message to the vehicle, where the reminder message indicates that the vehicle is about to enter the shadow region.

Optionally, the apparatus further includes an output unit configured to remind the user to perform at least one of the following operations: decelerating, turning on a headlight, turning on a warning light, and honking a horn.

Optionally, the apparatus further includes the control unit configured to control the vehicle to perform at least one of the following operations: decelerating, turning on a headlight, turning on a warning light, and honking a horn.

According to any one of the second aspect or the possible implementations of the second aspect, in still another possible implementation of the map data processing apparatus, the apparatus further includes a fourth obtaining unit configured to obtain parking requirement information of the user, where the parking requirement information indicates at least one of an estimated parking region, a parking start time, a parking end time, and parking duration, and a fifth processing unit configured to select at least one parking space based on the parking requirement information and the shadow information.

Optionally, the fourth obtaining unit is a fourth receiving unit configured to receive the parking requirement information from a mobile terminal. The apparatus further includes a fourth sending unit configured to send parking space recommendation information to the mobile terminal, where the parking space recommendation information indicates the at least one parking space. The mobile terminal includes but is not limited to a vehicle or a portable terminal (such as a mobile phone, a tablet computer, a notebook computer, a navigator, or a smart wearable device).

Optionally, the fourth obtaining unit is configured to obtain the parking requirement information based on an input of the user, or obtain the parking requirement information based on navigation information. Further, the apparatus further includes the display unit configured to recommend the parking space to the user on the display interface. Alternatively, the apparatus further includes the control unit configured to control display of recommending the parking space to the user on the display interface.

According to any one of the second aspect or the possible implementations of the second aspect, in still another possible implementation of the map data processing apparatus, the apparatus further includes a fifth obtaining unit configured to obtain travel information of the user, and a sixth processing unit configured to plan a travel route or a pick-up location for the user based on the travel information and the shadow information.

Optionally, the fifth obtaining unit is a fifth receiving unit configured to receive the travel information from the mobile terminal.

Optionally, the apparatus further includes a fifth sending unit configured to send travel suggestion information to the mobile terminal, where the travel suggestion information indicates the travel route or the pick-up location. The mobile terminal includes but is not limited to a vehicle or a portable terminal (such as a mobile phone, a tablet, or a navigator).

Optionally, the travel information includes at least one of a travel time, a travel mode (walking, cycling, or driving), a departure point, and a destination.

Optionally, the travel route meets a requirement of a minimum length of a route not covered by the shadow region.

Optionally, the apparatus further includes the display unit configured to recommend the travel route to the user on the display interface. Alternatively, the apparatus further includes the control unit configured to control display of recommending the travel route to the user on the display interface.

According to any one of the second aspect or the possible implementations of the second aspect, in still another possible implementation of the map data processing apparatus, the apparatus further includes a sixth obtaining unit configured to obtain solar energy charging requirement information of the user, and a seventh processing unit configured to determine, based on the solar energy charging requirement information and the shadow information, a first location for charging in a stationary state or a first route for charging in a moving state.

Optionally, the sixth obtaining unit is a sixth receiving unit configured to receive the solar energy charging requirement information of the user from the mobile terminal.

Optionally, the apparatus further includes a sixth sending unit configured to send solar energy charging indication information to the mobile terminal, where the solar energy charging indication information indicates the first location or the first route. The mobile terminal includes but is not limited to a vehicle or a portable terminal (such as a mobile phone, an IPAD, or a navigator).

Optionally, the solar energy charging requirement information includes at least one of a charging location region, a charging start time, a charging end time, and charging duration.

Optionally, the apparatus further includes the display unit configured to recommend the first location or the first route to the user on the display interface. Alternatively, the apparatus further includes the control unit configured to control display of recommending the first location or the first route to the user on the display interface.

According to any one of the second aspect or the possible implementations of the second aspect, in still another possible implementation of the map data processing apparatus, the apparatus further includes an eighth processing unit configured to determine, based on the shadow information, at least one of a location, brightness, and hue used for laser projection.

Optionally, the shadow information further includes the time information, and the time information indicates the time period in which the shadow region exists.

Optionally, the eighth processing unit is further configured to determine, based on the shadow information, a time for the laser projection.

According to a third aspect, a map data processing apparatus is provided. The map data processing apparatus includes a processor and a memory. The memory stores computer instructions. The processor runs the computer instructions, so that the map data processing apparatus performs the map data processing method according to any one of the first aspect or the possible implementations of the first aspect.

According to a fourth aspect, a map data processing apparatus is provided. The map data processing apparatus includes a processor and a communication interface. The processor reads computer instructions through the communication interface, and runs the computer instructions, so that the map data processing apparatus performs the map data processing method according to any one of the first aspect or the possible implementations of the first aspect.

According to a fifth aspect, a computer-readable storage medium is provided. The computer-readable storage medium stores computer instructions. When the computer instructions are executed by a processor, the map data processing method according to any one of the first aspect or the possible implementations of the first aspect is implemented.

According to a sixth aspect, a computer program product is provided. The computer program product includes computer instructions. When the computer instructions are executed by a processor, the map data processing method according to any one of the first aspect or the possible implementations of the first aspect is implemented.

According to a seventh aspect, an electronic map product is provided. The electronic map product includes shadow information. The shadow information indicates a shadow region. The shadow information includes location information. The location information indicates a geographical location of the shadow region.

According to the seventh aspect, in a possible implementation of the electronic map product, the shadow information is stored in a map in a data structure for storing an event.

According to any one of the seventh aspect or the possible implementations of the seventh aspect, in still another possible implementation of the electronic map product, the location information is expressed based on coordinates or a map element.

According to any one of the seventh aspect or the possible implementations of the seventh aspect, in still another possible implementation of the electronic map product, the shadow information further includes an identifier of the shadow region.

According to any one of the seventh aspect or the possible implementations of the seventh aspect, in still another possible implementation of the electronic map product, the shadow information further includes at least one of geometric information, time information, shadow degree information, and confidence level information. The geometric information indicates a shape or a size of the shadow region. The time information indicates a time period in which the shadow region exists. The shadow degree information indicates a shadow degree of the shadow region. The confidence level information indicates a reliability degree of the shadow region.

According to any one of the seventh aspect or the possible implementations of the seventh aspect, in still another possible implementation of the electronic map product, the time information includes at least one of a year field, a quarter field, a month field, a date field, an hour field, a minute field, and a timestamp.

According to any one of the seventh aspect or the possible implementations of the seventh aspect, in still another possible implementation of the electronic map product, the shadow degree includes at least one of an average illumination intensity value of the shadow region, an illumination intensity difference between the shadow region and a non-shadow region, a picture luminance difference between the shadow region and the non-shadow region, a picture contrast between the shadow region and the non-shadow region, and a shadow degree.

According to any one of the seventh aspect or the possible implementations of the seventh aspect, in still another possible implementation of the electronic map product, the confidence level information is determined based on at least one of the following factors: a weather condition, a reliability degree of a collection device, a reliability degree of a collection manner, and an amount of statistical data.

According to any one of the seventh aspect or the possible implementations of the seventh aspect, in still another possible implementation of the electronic map product, the shadow information is stored in a unit of a tile, and each tile includes a plurality of pieces of shadow information that indicate a plurality of shadow regions.

According to an eighth aspect, a computer-readable storage medium is provided. The computer-readable storage medium stores the electronic map product according to any one of the seventh aspect or the possible implementations of the seventh aspect.

According to a ninth aspect, a vehicle is provided. The vehicle includes the map data processing apparatus according to any one of the second aspect, the third aspect, the fourth aspect, or the possible implementations of the second aspect to the fourth aspect.

According to a tenth aspect, a system is provided. The system includes a first map data processing apparatus and a second map data processing apparatus. The first map data processing apparatus is configured to perform the map data processing method according to any one of the first aspect or the possible implementations of the first aspect when obtaining shadow information is generating shadow information. The second map data processing apparatus is configured to perform the map data processing method according to any one of the first aspect or the possible implementations of the first aspect when obtaining shadow information is receiving shadow information.

Technical effects of the second aspect to the tenth aspect are the same as technical effects of the first aspect, and details are not described herein again.

DESCRIPTION OF EMBODIMENTS

Figure 1:
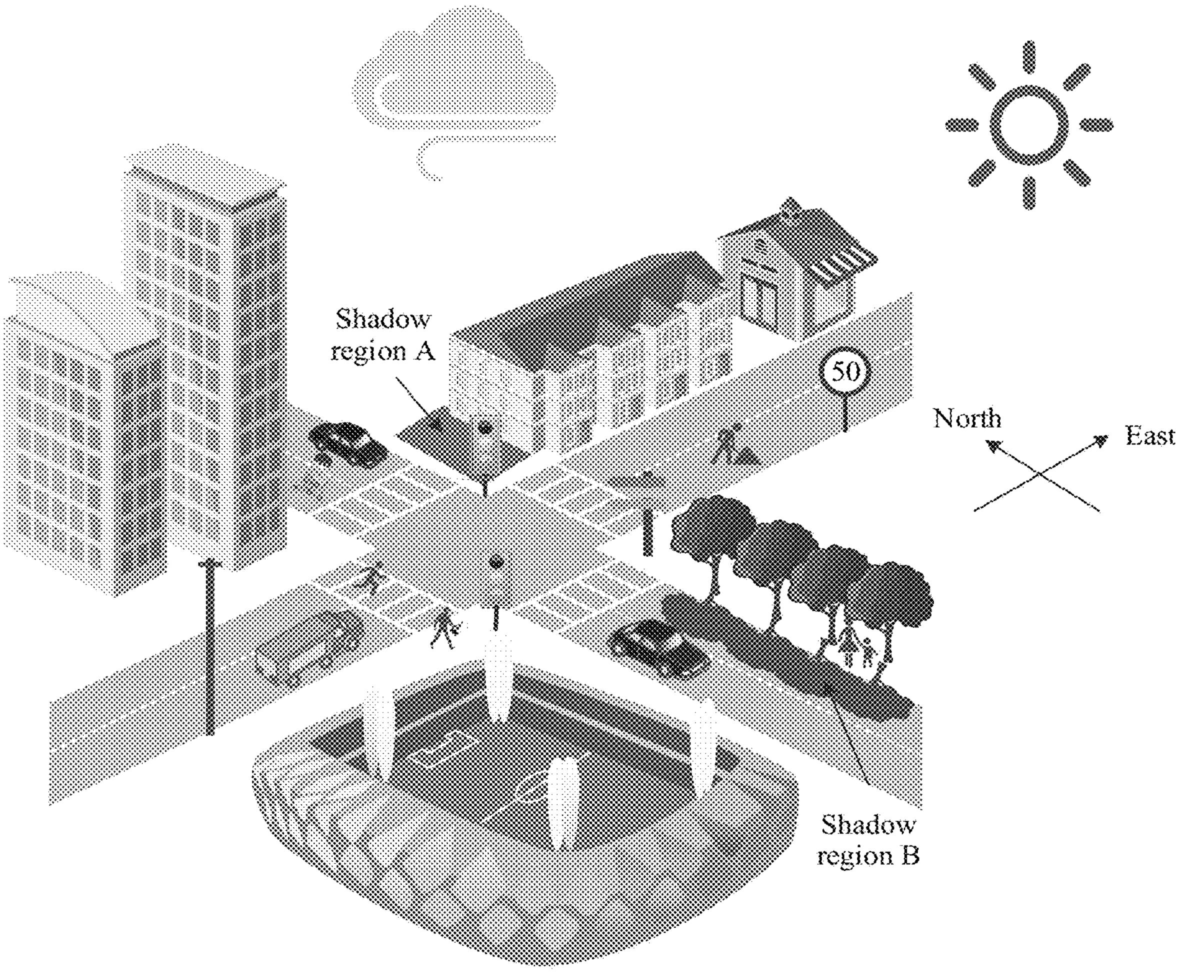
FIG. 1 is a schematic diagram of content indicated by map information according to an embodiment of this disclosure.

It should be noted that prefix words such as "first" and "second" used in this disclosure are merely used for distinguishing between different described objects, and are not intended to limit a location, an order, a priority, a quantity, or content of the described objects. For example, if a described object is a "field", ordinal numbers before "fields" in a "first field" and a "second field" do not limit a location or an order between the "fields". The "first" and the "second" do not limit whether the "fields" modified by the "first" and "second" are in a same message, and the "first" and the "second" do not limit a sequence of the "first field" and the "second field". For another example, if a described object is a "level", ordinal numbers before "levels" in a "first level" and a "second level" do not limit a priority between the "levels". For another example, a quantity of described objects is not limited by a prefix word, and may be one or more objects. For example, for a "first device", a quantity of "devices" may be one or more. In addition, objects modified by different prefixes may be the same or different. For example, if a described object is a "device", a "first device" and a "second device" may be a same device, a same type of device, or different types of devices. For another example, if a described object is "information", "first information" and "second information" may be information of a same content or information of different content. In a word, use of a prefix word used to distinguish described objects in embodiments of this disclosure does not constitute a limitation on the described objects. For a description of a described object, refer to a description in context of the claims or the embodiments, and the use of the prefix word should not constitute a redundant limitation.

It should be noted that a description manner such as "at least one item (or at least one) of a1, a2, . . . , and an" used in embodiments of this disclosure includes a case in which any one of a1, a2, . . . , and an exists independently, and also includes a case in which any two or more of a1, a2, . . . , and an are combined. Each case may exist independently. For example, a description manner of "at least one of a, b, and c" includes a case in which a exists independently, a case in which b exists independently, a case in which c exists independently, a case in which a and b are combined, a case in which a and c are combined, a case in which b and c are combined, or a case in which a, b and c are combined.

A map is a carrier of geographical information, and carries rich geographical location information. For example, in a city street scene shown in FIG. 1, information such as a topology structure of a road, division of lanes, and layouts and attributes of various buildings may be stored as map data and become a part of map information. With an increasing requirement of people for maps, map information becomes richer. In addition to information about a fixed location, a high-definition map may further include information about a non-fixed location like a moving vehicle or a pedestrian, and may even include information that changes with time, such as a status of traffic lights, road construction, a weather condition, or a traffic flow.

A map in embodiments of the present disclosure is an electronic map product or presentation of an electronic map product. For example, the electronic map product may be a map data product that carries map information, for example, a map update data packet, or may be a map application product to which map information is loaded, for example, a map application that can be installed on a vehicle or a portable terminal, or may be a map display product that presents map information, for example, an electronic navigator.

Figure 2:
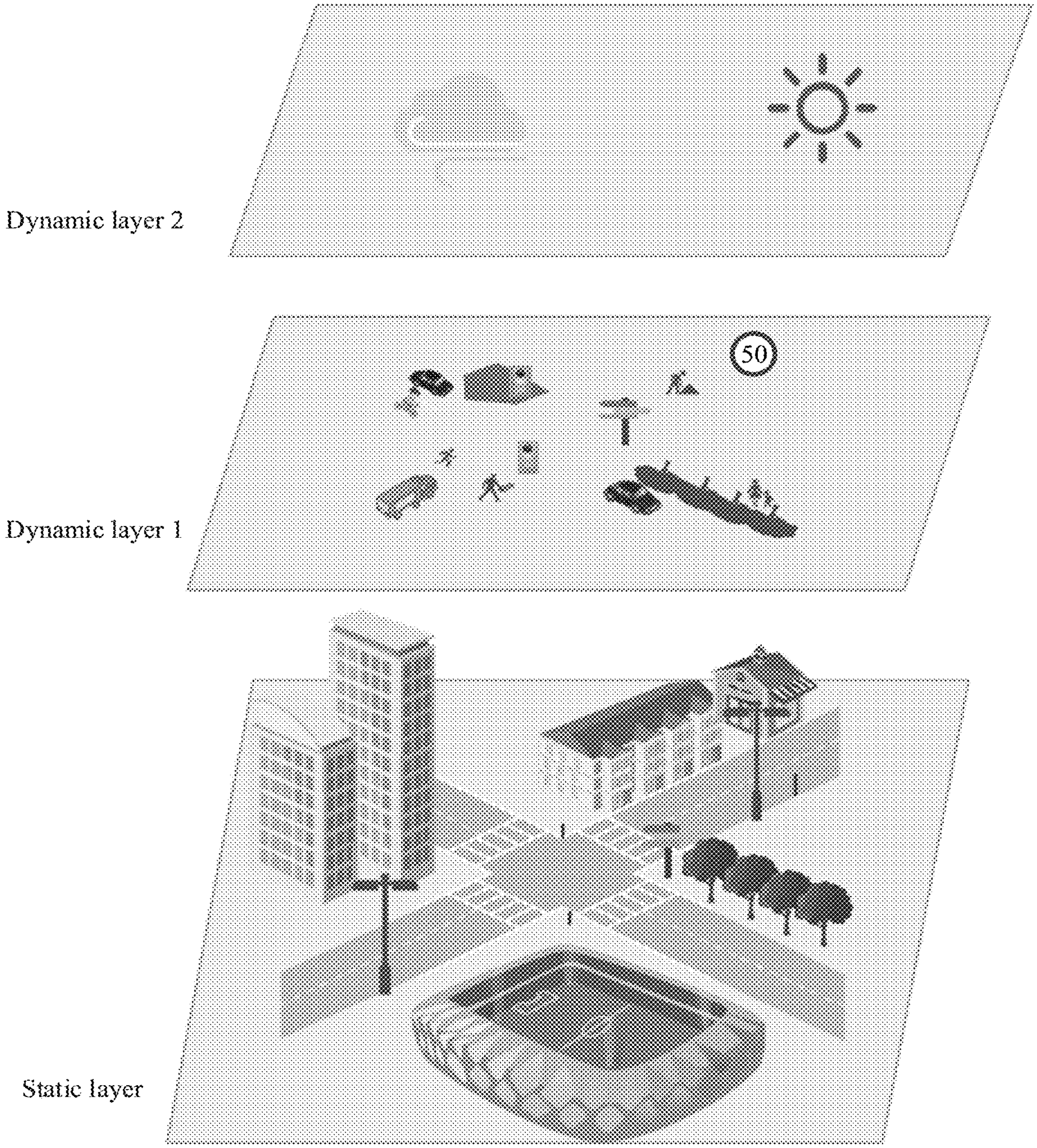
FIG. 2 is a schematic diagram of a dynamic layer and a static layer on a map according to an embodiment of this disclosure.

A map includes a plurality of layers, and a layer is a map data set with an organization structure. Data in a layer is organized in a specific data structure, and can describe information elements from a plurality of sources. Based on a time variability of an information element, the information element may be classified into two types: an element or an event. The element is an information element that is fixed, has a small change, or has a long update period, for example, a road topology, a building location, a lane line, a lane direction, or a traffic infrastructure layout. The event is an information element with a strong time-varying characteristic, for example, a traffic accident, a weather change, a road construction or traffic congestion status. In a map, an element and an event may be recorded on different layers. For example, information about the element is carried by a static layer in the map, and information about the event is carried by a dynamic layer in the map. The map may include one or more static layers, and may further include one or more dynamic layers. To describe the static layer and the dynamic layer, a plurality of types of map information shown in FIG. 1 are mapped to a plurality of layers of a map shown in FIG. 2. FIG. 2 presents one static layer and a plurality of dynamic layers. The static layer records a geographical distribution of buildings, roads, trees, traffic lights, and road signs in FIG. 1. A dynamic layer 1 records a real-time speed limit status, a traffic construction status, and a passenger and vehicle flow status of a lane. A dynamic layer 2 records a weather condition, for example, a sunny day, a rainy day, a snowy day, a windy day, a temperature, or humidity. It should be noted that, for a map record object, the map record object may have both a time-varying information element and a non-time-varying information element. The non-time-varying information element refers to an information element that is fixed, has a small change, or has a long update period. In other words, the map record object is related to both an element in the map and an event in the map. For example, for a lane, a geographical location of the lane is an element in the map, and a traffic flow of the lane is an event in the map. For a traffic light, a location of the traffic light in an intersection is an element in the map, and a light change of the traffic light is an event in the map. For a speed limit sign, a location of the speed limit sign in an intersection is an element in the map, and when a speed limit value indicated by the speed limit sign changes, a speed limit change is an event in the map.

In the conventional technology, there is no map in which information about a shadow region caused by sunlight is maintained as map information. Embodiments of this disclosure provide a map including shadow information used to describe a shadow region. In other words, the shadow information used to describe the shadow region is maintained in the map as a new type of map information. The shadow region herein refers to a ground region whose intensity of receiving light is weaker than that of a surrounding region. For example, the shadow region may be a ground region covered by a shadow of a nearby building, a ground region covered by a ceiling, a region in a tunnel, or a ground region covered by a leaf spot under a lush tree. For example, in FIG. 1, a street scene on a sunny day at 10:00 a.m. is shown. The sun is located in the east, and when the sun shines on buildings in the intersection and roadside trees, a shadow region A and a shadow region B are generated. The shadow information may be used as an independent layer. For example, in addition to the three layers shown in FIG. 2, a dynamic layer 3 may be generated to record information about the shadow region A and the shadow region B. Alternatively, the shadow information and other map information may be placed in one layer together. For example, the dynamic layer 1 in FIG. 2 includes information about the shadow region A and the shadow region B.

In embodiments of this disclosure, map generation and use are included. An application scenario in embodiments of the present disclosure is described below by using FIG. 3 as an example.

Figure 3:
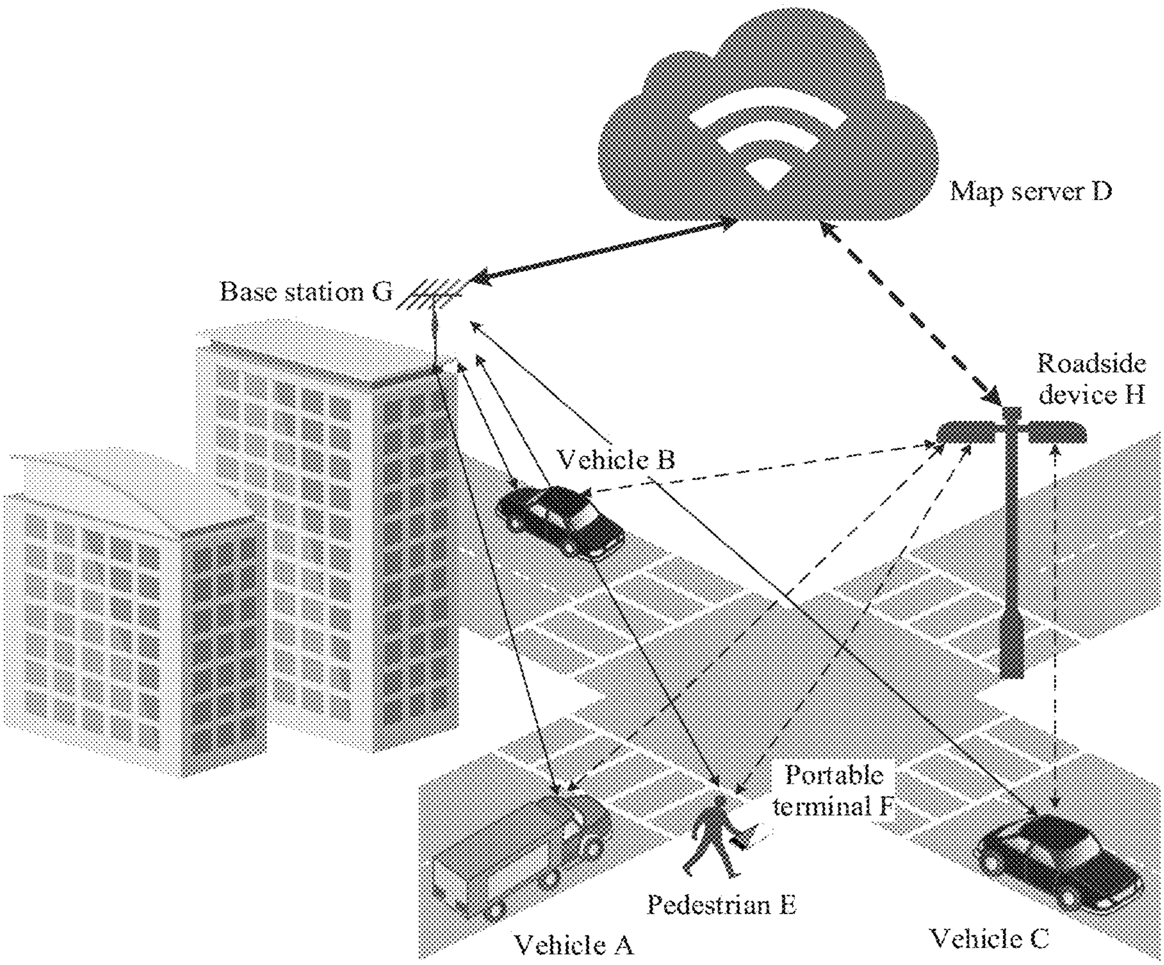
FIG. 3 is a schematic diagram of an application scenario according to an embodiment of this disclosure.

In FIG. 3, vehicles running on a road include three types: a collection vehicle, a crowd-sourcing vehicle, and a common vehicle. A vehicle A is a collection vehicle. The vehicle A is a professional map information collection vehicle, has high costs, and is generally owned by a map manufacturer. The vehicle A is equipped with a sensing device like a lidar, a millimeter wave radar, a camera, or a global navigation satellite system (GNSS), and carries out mapping on a road to provide basic data for the map manufacturer to map. Data collected by the collection vehicle may be sent to a map server D through a wireless communication network or a wired communication network, or may be stored on a storage medium, and then the data on the storage medium is manually copied to the map server D. The map server D serves as a production device and/or a storage device of a map, and may be a centralized server or a distributed server. A vehicle B is a crowd-sourcing vehicle. Different from that of a dedicated collection vehicle, after signing a contract, a user or an owner of the crowd-sourcing vehicle can provide collected basic data to a map manufacturer. This map data collection mode is a future trend, and has an advantage that richer, more real-time and lower-cost basic data can be obtained. A vehicle C is a common vehicle, and does not collect data for a map manufacturer. In other words, the vehicle C is a user of a map, but the vehicle C may not provide basic data for map update or generation. The common vehicle may be converted into a crowd-sourcing vehicle in a form of signing a contract or the like. Both the common vehicle and the crowd-sourcing vehicle can be used as users of a map to assist vehicles in positioning, target recognition, driving decision-making, or navigation. The vehicle can be equipped with the map function through pre-delivery installation or post-delivery installation, and the map in the vehicle can be updated during use to provide more accurate or real-time reference information. To meet real-time requirements, an update period of the high-definition map may be set as required. For example, the update period is in a unit of a month, a week, a day, an hour, or a minute.

In addition to a vehicle, another type of mobile terminal may alternatively be used as a user of the map, for example, a portable terminal like a mobile phone, a handheld navigator, a notebook computer, a tablet computer, or a wearable device. These mobile terminals are pre-installed with a map before delivery, or load a map by using a map application installed after delivery, and thereafter receive updated map information to update a locally stored map. In embodiments of this disclosure, the vehicle and the other type of mobile terminal are subsequently collectively referred to as a terminal or a terminal device.

In addition, a roadside device can also be a producer or a user of the map. The roadside device is infrastructure installed on a roadside and has a function of computing, communication, storage, or the like. The roadside device includes but is not limited to a roadside edge computing (REC), a road side unit (RSU), or a device that integrates an REC and an RSU. Even in the future, roadside infrastructure such as a traffic light, a traffic sign, a charging pile, a garbage bin, or a billboard can become a roadside device by installing a computing unit or a communication unit. In FIG. 3, a camera sensor and a vehicle to everything (V2X) communication module are added to a street lamp, so that the street lamp is reconstructed into an intelligent roadside device H. The roadside device H may obtain and use the map generated by the map server D. The roadside device H may further obtain sensing data based on a sensing device of the roadside device H or receive sensing data sensed by a vehicle from the vehicle, and generate map data based on the sensing data, to update a map stored in the roadside device H, or send the obtained sensing data or the generated map data to the map server D.

The map server may provide a service for a terminal in a cloud form. In addition, a communication link between the map server and the terminal is bidirectional. To be specific, the map server may transmit information to the terminal, and the terminal may also transmit information to the map server. Communication between the map server and the terminal may be implemented through wireless communication and/or wired communication. Still refer to FIG. 3. For example, a map generated by a cloud is released to a terminal. The terminal accesses a wireless network through a base station G, and the map server D releases updated map information to a vehicle A, a vehicle B, a vehicle C, or a portable terminal F held by a pedestrian E. The updated map information may be released through the base station G (as shown by a solid line in the figure), or may be forwarded to the terminal through the roadside device H (as shown by a dotted line in the figure). The map server D and the base station G may be connected in a wireless manner or a wired manner. The roadside device H and the map server D may be connected in a wireless manner or a wired manner. In addition, the roadside device H and the map server D may communicate with each other through the base station G or another base station. The wireless network includes but is not limited to second generation (2G) cellular communication, such as a Global System for Mobile Communications (GSM) and a General Packet Radio Service (GPRS), third generation (3G) cellular communication, such as wideband code-division multiple access (CDMA) (WCDMA), time-division synchronous CDMA (TS-SCDMA), and CDMA, fourth generation (4G) cellular communication, for example, Long-Term Evolution (LTE), fifth generation (5G) cellular communication, or another evolved cellular communication technology.

Because both the roadside device and the terminal device have an information collection capability and a computing capability, in some embodiments, in addition to serving as a receiver and a user of the map, the roadside device and the terminal device may also serve as a producer of the map to locally generate map information, and the map information is used by the roadside device and the terminal device or sent to another roadside device or terminal device.

A shadow is generated for many reasons. On one hand, there are fixed reasons, such as a location and a height of a building. On another hand, there are non-fixed but regular reasons, such as a change of a solar location and a solar altitude angle in a day. On still another hand, there are non-fixed and irregular reasons, such as a change of a weather condition. A sensing module of a vehicle or a roadside device has a shadow detection function, and shadow information may be preliminarily obtained by collecting a shadow detection result of the vehicle or the roadside device, or may be preliminarily obtained through calculation based on original location information and height information of a building on a map and with reference to a local solar location and height change rule, or may be preliminarily obtained by fusing results obtained in the two manners Further, the preliminarily obtained shadow information may be dynamically adjusted with reference to a real-time weather change, to obtain shadow information that changes in real time. For example, after a weather changes from sunny to cloudy, a coverage scope of the shadow region may become larger, or a difference between light intensity of the shadow region and light intensity of a non-shadow region may become smaller, so that a shadow degree of the shadow region becomes smaller.

Because the shadow information is map information that changes with time, in embodiments of this disclosure, the shadow information is described in a data structure similar to a data structure used to describe an event in a map. Content and a data organization structure of the shadow information are not limited in embodiments of this disclosure, and are merely described by using examples. Regardless of a plurality of types of content indicated by the shadow information or data organization structures of the plurality of types of content, there are many implementation forms under the embodiments of this disclosure.

Figure 4:
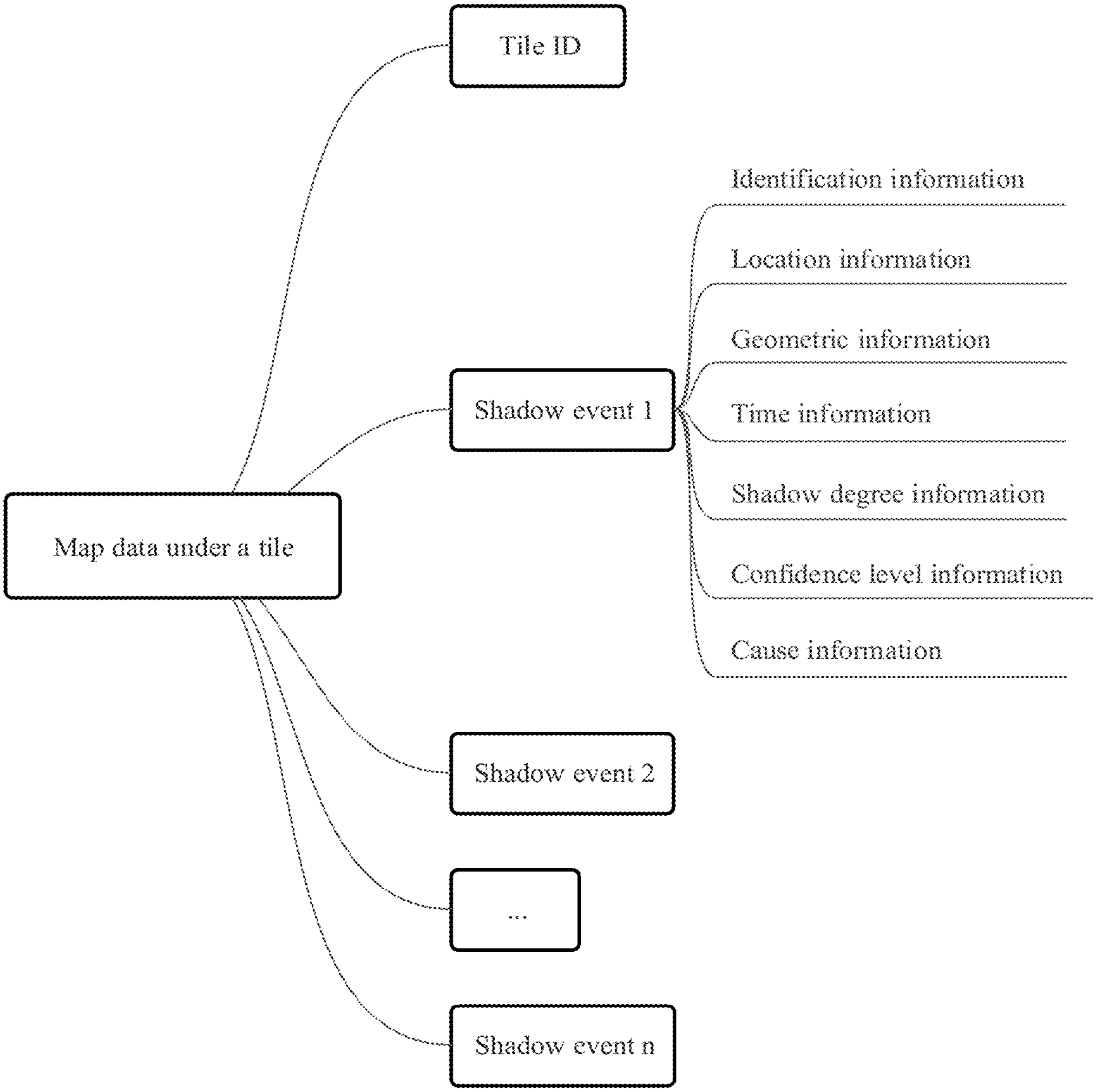
FIG. 4 is a schematic diagram of an expression manner of shadow information according to an embodiment of this disclosure.

With reference to FIG. 4, the following uses a tile map as an example to describe a map data structure of the shadow information. In FIG. 4, information about a shadow region is used as a special event, namely, a shadow event, and each shadow event in a tile is described separately in a unit of a tile.

The tile map is a pyramid model map, namely, a multi-resolution hierarchical model map. From a bottom to a top of a tile pyramid, a resolution gradually changes, for example, getting lower, but an indicated geographical scope remains unchanged. An N-layer tile map is used as an example. A quantity of zoom levels of the map is N, where N is an integer greater than 1. A map picture with a highest zoom level and a largest map scale is used as a bottom layer of a pyramid, namely, a layer 0. The map picture is sliced into a plurality of rectangular (or square) map tiles to form map pictures at a layer 1. On the basis of the map pictures at the layer 1, the map pictures at the layer 1 are sliced into a plurality of rectangular (or square) map tiles to form map pictures at a layer 2. By analogy, a layer N−1 is obtained to form the entire tile pyramid. Slicing of map tiles at each layer may be performed based on a slicing ratio, and slicing of map tiles at different layers may be performed based on a same slicing ratio or different slicing ratios. It can be learned that a tile may be understood as follows. A map picture within a specific scope is sliced into several rows and columns of rectangular raster pictures, and the rectangular raster picture obtained through slicing is referred to as a tile. A higher map resolution indicates a larger quantity of slicing times, a larger quantity of tiles that form the map, and a higher tile level. For example, if a slicing manner is cross slicing (that is, a slicing ratio is 2×2), a tile of a specific level may be sliced into four tiles of a corresponding higher level. For example, a tile 1 is a tile of a specific level in the map. After cross slicing is performed on the tile 1, four tiles of a level higher than a level of the tile 1 are generated, and the four tiles are identified as 1-00, 1-01, 1-10, and 1-11. It may be understood that a geographical coverage scope of the tile 1 is a union of a geographical coverage scope of the tile 1-00, a geographical coverage scope of the tile 1-01, a geographical coverage scope of the tile 1-10, and a geographical coverage scope of the tile 1-11.

In a tile corresponding to a tile identifier (ID) shown in FIG. 4, there are n shadow regions, and correspondingly, there are n shadow events in map data about the tile, where n is a natural number greater than or equal to 1. Information content and/or data organization structures of different shadow events may be the same or different. A shadow event 1 is used as an example. The shadow event 1 includes one or more of identification information, location information, geometric information, time information, shadow degree information, confidence level information, and cause information. The following separately describes the content.

(1) Identification Information:

The identification information indicates an identifier of the shadow event, and each shadow event has a unique identifier in a tile.

(2) Location Information:

The location information indicates a geographical location of a shadow region corresponding to the shadow event. The following are two expression manners that describe the geographical location of the shadow region.

In a first manner, the geographical location is described based on coordinates. For example, a location point is indicated by using absolute coordinates or relative coordinates in a rectangular coordinate system. The location point may be one or more points in the shadow region, for example, a center point, a point on a boundary, or a vertex of a polygon region. The absolute coordinates are fixed location coordinates described based on a fixed coordinate system origin, and absolute coordinates of a target object do not change with a reference object. The relative coordinates describe a relative location of a target object relative to a reference object, and the relative coordinates change with a location of the reference object.

In a second manner, the geographical location is described with reference to a map element. For example, if the map element is a lane, the location of the shadow region is a section of the lane. If the map element is a tunnel, the shadow region is a region covered by the tunnel. If the map element is an intersection, the shadow region is a driving-in/driving-out region of some lanes in a plurality of lanes that converge into the intersection. If the map element is two staggered viaducts, the shadow region is an intersection region of the two viaducts and is located on a road surface of a lower viaduct.

The expression manners of the location information are merely used as examples, and a specific expression manner of the location information is not limited in embodiments of the present disclosure.

(3) Geometric Information:

The geometric information indicates a shape or a size of the shadow region corresponding to the shadow event. The shape includes but is not limited to a polygon, a sector, a circle, and the like. The size includes but is not limited to a side length of a polygon, a radian of a sector, a radius of a circle, and the like. In addition, the geometric information of the shadow region may be expressed with reference to a map element, for example, expressed as a section that is along a road or a lane and has a starting and ending distance.

Figure 5A:
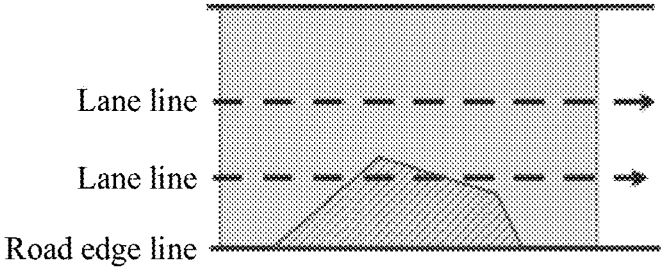
FIG. 5A is a schematic diagram of geometric information that is about a shadow region and that is expressed based on a polygon according to an embodiment of this disclosure.
Figure 5B:
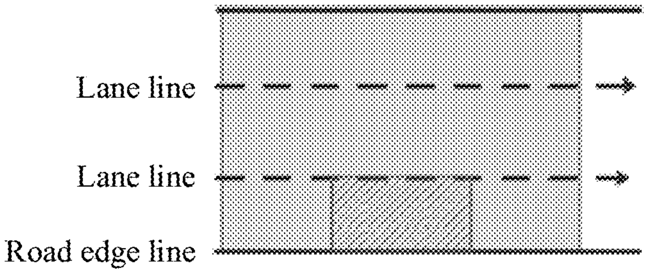
FIG. 5B is a schematic diagram of geometric information that is about a shadow region and that is expressed based on a lane section according to an embodiment of this disclosure.

When the shadow region may be determined by using the location information, the geometric information may not be used. For example, the location information provides all boundary points of the shadow region, and the shadow region may be determined by connecting the boundary points. In this case, the geometric information may not be set. For example, FIG. 5A shows a shape of a shadow region expressed based on an irregular quadrilateral. In FIG. 5A, a shape and a size of the quadrilateral shadow region may be recorded in shadow information by using coordinates of four vertices of the quadrilateral. The shadow information recorded in this manner is close to a real form of the shadow region. When the geographical location is described with reference to the map element, the geometric information may also not be used, provided that a starting location and an ending location of the shadow region on a lane or a lane line are provided. Alternatively, the shadow region may be determined with reference to the location information and the geometric information. For example, a starting location or an ending location of the shadow region on a lane or a lane line is provided based on the location information, and a length of the shadow region on the lane is provided based on the geometric information. For example, FIG. 5B shows a shape of a shadow region expressed based on a lane. Two edges of a vehicle become edges of the shadow region. This is an expression manner obtained by performing data processing based on a real form of the shadow region. Because an exact shape and size of the shadow region may not be required in actual application, this expression manner can simplify a requirement of shadow information, and is beneficial to actual application.

The expression manners of the geometric information are merely used as examples, and a specific expression manner of the geometric information is not limited in embodiments of the present disclosure.

(4) Time Information:

The time information indicates a time period in which the shadow information belonging to the shadow event exists. The time information is optional information, and may or may not be presented to a user. In addition, time information of a non-time-varying shadow region may not be set.

The shadow information has a seasonal characteristic. For example, a shadow area or a shadow degree under a leaf may change with the four seasons. The shadow information has a time-period characteristic. For example, a shadow location, a shadow area or a shadow shape may change with sun orientation in a day. The shadow information also has a stable time statistics characteristic, because buildings, trees, and the like around a road are fixed. Therefore, road shadow information generated in a statistical manner has statistical stability and may change, and using the shadow information as dynamic information in the map may be well implemented.

Shadow information corresponding to each shadow region may include a plurality of pieces of different time period information, and each piece of time period information may include the following fields:

(a) A quarter field may be included, such as values 1 to 4, and at least one quarter in which the shadow information is in a valid state may be indicated by including a plurality of values;

(b) A month field may be included, such as values 1 to 12, and at least one month in which the shadow information is in a valid state may be indicated by including a plurality of values;

(c) A date field may be included, such as values 1 to 31, and at least one day in which the shadow information is in a valid state may be indicated by including a plurality of values;

(d) An hour field may be included, such as values 0 to 24, and at least one hour in which the shadow information is in a valid state may be indicated by including a plurality of values, and a minute value may further be expressed by using a decimal place of a floating point number; and (e) An update time field may be included to describe an update time of the shadow information, and may be in a date form or a timestamp form, and this is not limited.

The plurality of pieces of time period information can be used together. For example, if a shadow region exists only from 10:00 a.m. to 12:00 a.m. in July and August each year, values of the month field are 7 and 8, and values of the hour field are 10 and 11.

The expression manners of the time information are merely used as examples, and a specific expression manner of the time information is not limited in embodiments of this disclosure.

(5) Shadow Degree Information:

The shadow degree information indicates a shadow degree of the shadow region corresponding to the shadow event.

Different shadow regions may have different shadow degrees, and shadow degrees at different locations in a same continuous shadow region may also be different. Therefore, in some application scenarios, there is a requirement for quantitative expression of the shadow degree of the shadow region.

A quantization indicator is used to represent a shadow degree, and may be in either of the following two forms.

A first type is an indicator value form. The indicator may be a value or may be a scope, and includes but is not limited to the following indicators:

i. An average light intensity of the shadow region;

ii. A light intensity difference between the shadow region and the non-shadow region, namely, a difference between an average light intensity of the shadow region and an average light intensity of a common non-shadow region;

iii. A picture luminance difference between the shadow region and the non-shadow region, namely, a difference between average image luminance of the shadow region and average image luminance of the non-shadow region that are obtained at a conventional angle; and iv. A picture contrast between the shadow region and the non-shadow region, namely, an average contrast between a picture in the shadow region and a picture in the non-shadow region that are obtained at a conventional angle.

A second type is a grading form. For example, similar descriptions such as a heavy shadow region, a relatively heavy shadow region, and a light shadow region may be used to distinguish different levels of shadow degrees, or similar descriptions such as a first-level shadow region, a second-level shadow region, and a third-level shadow region may be used to distinguish different levels of shadow degrees.

In addition, the two forms may be combined for expression, that is, a form in which an indicator value is combined with a level is used. For example, a shadow degree of a shadow region is expressed as "the shadow region belongs to a second-level shadow region, and an average light intensity of the shadow region is 50 lux".

The shadow degree information is optional information, and whether to use the shadow degree information may be determined based on different application requirements. For example, if the shadow information is applied to parking, the shadow degree information may not be used in the shadow information. If the shadow information is applied to auxiliary sensing, the shadow degree information may be used.

Further, for different application requirements, shadow information layers with different fineness may be constructed, and the different fineness is reflected as follows. At different shadow information layers, the shadow degree information has different grading granularities, different grading quantities, different indicator granularities, different indicator quantities, different precisions, or the like.

The expression manners of the shadow degree information are merely used as examples, and a specific expression manner of the shadow degree information is not limited in embodiments of this disclosure.

(6) Confidence Level Information:

The confidence level information indicates a reliability degree of the shadow region corresponding to the shadow event, namely, a confidence level. The reliability degree may be expressed in a form of a numeric value (for example, a floating point number between 0 and 1), for example, quantized, in the confidence level information.

The shadow information is easily affected by natural weather and other environments. For example, in a cloudy scene, a shadow region with a large parallax is not formed. The shadow layer integrates weather data of the region in which the shadow layer is located, such as light intensity, a temperature, and humidity, to provide a valid confidence level of the shadow layer. In addition, the confidence level may also be generated with reference to other factors that affect reliability of the shadow information, such as precision of a collection device and an amount of statistical data. The confidence level information may be determined with reference to at least one of the following plurality of factors:

i. A weather condition, for example, a sunny day, a rainy and snowy day, or a smog day;

ii. A weather parameter, for example, light intensity (which directly affects the shadow degree), visibility (which affects the shadow degree in a smog weather), a temperature (which is used to assist in determining the confidence level), humidity (which is used to assist in determining the confidence level), or wind force (which is used to assist in determining the confidence level);

iii. A reliability parameter of a collection device and a collection mode; and iv. An amount of statistical data used to generate the shadow information.

The confidence level information may be used as optional information of the shadow information, and a user of the shadow information may choose, based on the confidence level information, whether to use the shadow information, or set a weight of the shadow information in use.

The confidence level information may further indicate an application scope of the confidence level. For example, corresponding confidence level information may be associated with shadow information of different levels based on a specific calculation manner of the confidence level, and the following two association manners are included:

i. Wide-scope association, where the confidence level information may be associated with a single tile, and shadow regions under the entire tile has same confidence level, where for example, the weather affects a large scope, and leads to an overall decrease in the confidence level of the shadow regions under the single tile; and ii. Small-scope association, where the confidence level information may be associated with a specific shadow event, where for example, a small amount of sample data is collected at a road location, and a small amount of statistical data causes a low confidence level of a shadow region on the road.

The expression manners of the confidence level information are merely used as examples, and a specific expression manner of the confidence level information is not limited in embodiments of this disclosure.

(7) Cause Information:

The cause information indicates a cause of generating the shadow region corresponding to the shadow event. For example, a projection of a building under sunlight, a light spot of a leaf, a ceiling cover, a cloud cover, or a tunnel or a culvert may be expressed in the cause information in a predefined index manner. For example, the five causes may be indexed as "01", "02", "03", "04", and "05" respectively.

It should be noted that the expression manners of the shadow information shown in FIG. 4 are merely examples. Composition content and a data structure of the shadow information are not limited in embodiments of this disclosure. Each of the seven types of content of the shadow information in the foregoing examples is not necessarily included in the shadow information, that is, may be selectively included in the shadow information based on an actual application requirement. Not only any one of the seven types of content may be selected to be independently expressed in the shadow information, but also at least two types of content may be selected to be expressed in a combination manner. For example, because a location and a degree of the shadow change in a day with the change of the location of the sun, the time information, the location information, and the shadow degree information may be combined to indicate combination information such as "8:00 a.m. to 9:00 a.m., shadow on a west side of the building, light shadow", "11:00 a.m. to 1:00 p.m., shadow on a south side of the building, heavy shadow", and "4:00 p.m. to 5:00 p.m., shadow on an east side of the building, heavy shadow" in the shadow information. For another example, because shadow information in a cloudy weather has a lower reliability degree than that in a clear weather, the time information and the confidence level information may be combined to indicate combination information such as "August 1, confidence level of 1" and "August 2, confidence level of 0.5" in the shadow information (where August 1 is sunny and August 2 is cloudy). For another example, because different locations in a shadow region may have different shadow degrees, the location information and the shadow degree information may be combined to indicate combination information such as "location 1, shadow degree 1", "location 2, shadow degree 2", and "location 3, shadow degree 3" in the shadow information.

Figure 6:
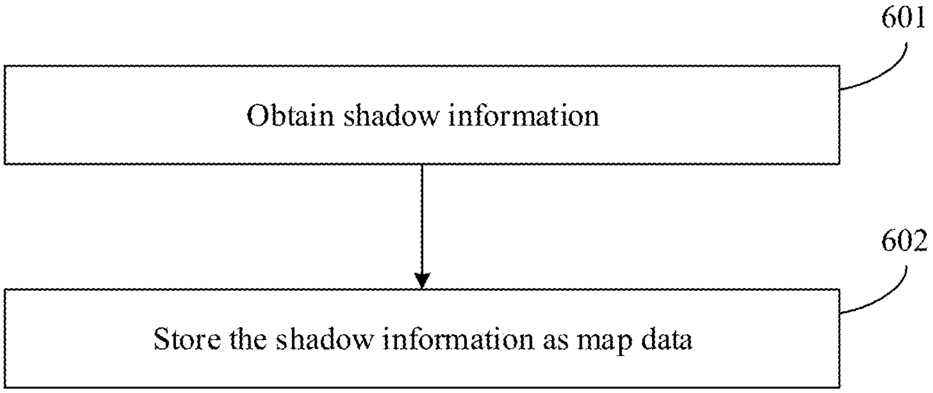
FIG. 6 is a flowchart of a map data processing method according to an embodiment of this disclosure.

As shown in FIG. 6, an embodiment of this disclosure provides a map data processing method, including the following steps.

Step 601: Obtain shadow information. The shadow information indicates a shadow region, the shadow information includes location information, and the location information indicates a geographical location of the shadow region. Optionally, the location information may be described in either of the foregoing two description manners: based on coordinates or with reference to a map element. Optionally, the shadow information may further include one or more of identification information, geometric information, time information, shadow degree information, confidence level information, and cause information. A data structure of the shadow information includes but is not limited to the manner shown in FIG. 4. In addition to descriptions based on a data structure that is in a tile and that is used to describe an event in a map, for example, the shadow region may also be associated with an element in the map, and the shadow information may be recorded in the map as attribute information or additional information of the element. Composition content or a data organization manner of the shadow information is not limited in embodiments of this disclosure.

Obtaining shadow information may include generating the shadow information or receiving the shadow information.

When the shadow information is obtained by generating the shadow information, the method shown in FIG. 6 is performed on a map generation side. Based on the foregoing descriptions that apparatuses on a cloud, a roadside, or a terminal all have a map generation capability, the method shown in FIG. 6 may be, for example, executed by a map server, a roadside device, a vehicle, or a mobile terminal, or may be performed by a component, a chip, a software module, or a hardware module in the four devices.

A plurality of manners may be used to generate the shadow information. The following manners are used as examples, and may be independently used, or may be used in combination to generate the shadow information.

Manner 1: Road surface picture data collected by a sensing device that has a sensing capability, for example, a map collection vehicle, a crowd-sourcing vehicle, or a roadside device, is obtained. A processor processes the road surface picture data to identify a shadow region in the road surface picture data, and obtains shadow information such as time information, confidence level information, or shadow degree information based on a statistical value of the road surface picture data.

Manner 2: Map data is obtained, including information such as a location, a spatial geometric shape, a height, and a longitude and a latitude of a group of buildings. A shadow region at a specific time is calculated according to a shadow estimation algorithm with reference to a local change of a solar altitude angle in one year or one day, to obtain shadow information of the shadow region.

Manner 3: After a preliminary result of the shadow information is obtained (for example, in Manner 1 and/or Manner 2), a weather condition is further obtained, and the preliminary result of the shadow information is adjusted with reference to the weather. For example, a shadow degree on a cloudy day is reduced. For another example, on a cloudy day, a location of a shadow region covered by a corresponding cloud is adjusted based on a movement of the cloud.

When the shadow information is obtained by receiving the shadow information, the method shown in FIG. 6 is performed on a map receiving side, and includes receiving the shadow information from another device, component, chip, interface, hardware module, or software module. The receiving includes but is not limited to an information receiving operation in a manner such as wired transmission, wireless transmission, parameter invoking, or interface feeding. Based on the foregoing description that an apparatus on a cloud, a roadside, or a terminal may have a requirement of using map information, the method shown in FIG. 6 may be, for example, executed by a map server, a roadside device, a vehicle, or a mobile terminal, or may be performed by a component, a chip, a software module, or a hardware module in the four devices.

Step 602: Store the shadow information as map data. The shadow information may be further stored in a storage medium of a cloud, a roadside, or a terminal, and the storage medium includes but is not limited to a magnetic medium, an optical medium, a semiconductor medium, or the like. Storing the shadow information as map data is embodied in storing the shadow information as element-related information or event-related information in the map together with other map information to construct a map database, or embodied in storing the shadow information based on a data format of the map information for being invoked by a map application, or embodied in storing the shadow information based on a storage unit of the map, namely, a tile, where the tile is used as a shadow information organization unit, and each tile includes a plurality of pieces of shadow information that indicate a plurality of shadow regions.

According to the map data processing method shown in FIG. 6, the shadow information indicating the shadow region is added to map data, so that map content is enriched, and more diversified use requirements can be met. With reference to FIG. 7 to FIG. 13, the following shows a plurality of methods for processing the shadow information on the map generation side or the map receiving side.

FIG. 7 to FIG. 10 describe flowcharts of four map data processing methods performed on the map generation side, and these methods are further extended based on the map data processing method (an implementation of obtaining the shadow information by generating the shadow information) shown in FIG. 6 to meet requirements of different map generation side application scenarios.

Figure 7:
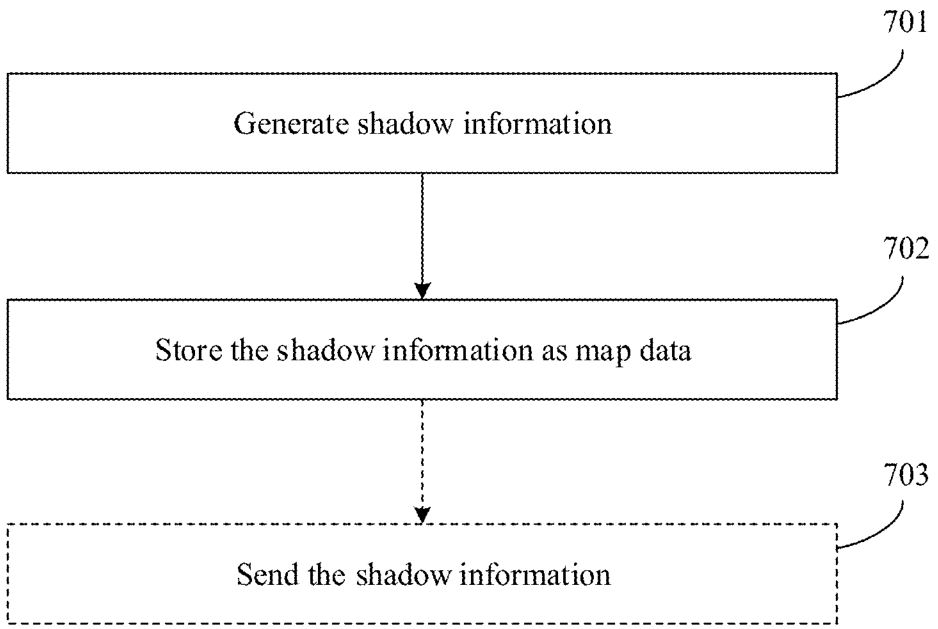
FIG. 7 is a flowchart of a first map data processing method performed on a map generation side according to an embodiment of this disclosure.

As a type of map information, the shadow information is generated and stored on the map generation side, and is sent to a map use side. FIG. 7 is a map data processing method for releasing the shadow information on the map generation side, and the method includes step 701 to step 703. Step 701 is the same as step 601, and step 702 is the same as step 602. Details are not described herein again.

Step 703: Send the shadow information to the map use side. Further, the shadow information may be added to a map data packet or a map upgrade package and sent to the map use side. The sending includes but is not limited to sending in a manner such as wired transmission, wireless transmission, parameter invoking, or interface feeding. The map use side includes but is not limited to a map server, a roadside device, a vehicle, a mobile terminal, or a component, a chip, a software module, or a hardware module in the four devices. For example, a cloud server packs the shadow information into a map upgrade package, and sends the map upgrade package to a roadside device or a vehicle. In this case, the map generation side and the map receiving side are located in different devices. For another example, in a cloud server, the shadow information in a map database is sent, through an output interface of a memory, to a processor configured to process the shadow information. In this case, the map generation side and the map receiving side are located in a same device.

Figure 8:
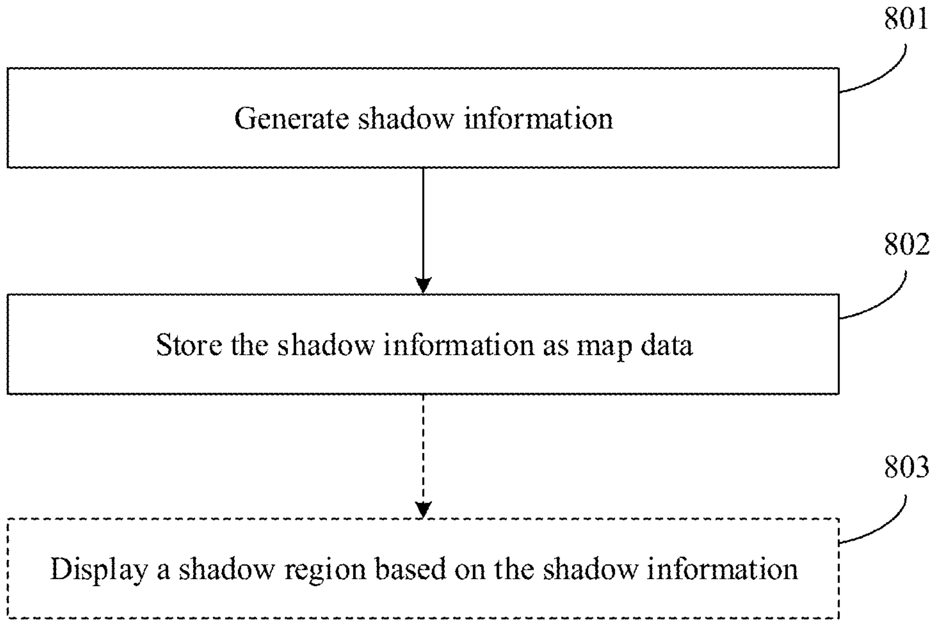
FIG. 8 is a flowchart of a second map data processing method performed on a map generation side according to an embodiment of this disclosure.

When the map generation side has a display capability, the map generation side may further perform an operation of displaying the shadow region. FIG. 8 is a map data processing method for displaying the shadow information on the map generation side, and the method includes step 801 to step 803. Step 801 is the same as step 601, and step 802 is the same as step 602. Details are not described herein again.

Step 803: Display the shadow region based on the shadow information. The displaying includes but is not limited to displaying on a display on the map generation side or displaying through external projection. The display interface of the shadow region is described in detail in the following.

For example, when the map generation side is a vehicle, a map drawn with the shadow region may be displayed on a central control screen of the vehicle, or a laser image of the shadow region may be projected on a front windshield based on a head up display (HUD), so that a projection image is superimposed on a physical scene seen through the windshield.

Figure 9:
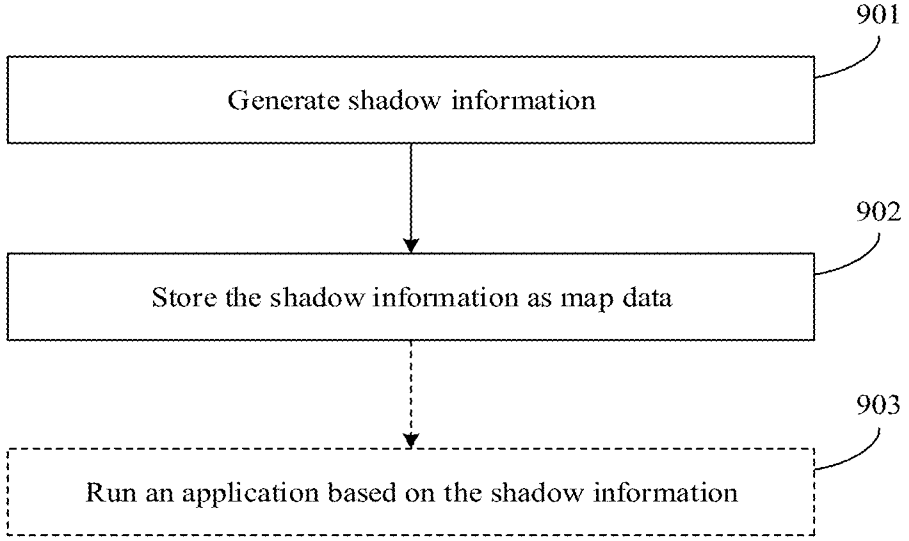
FIG. 9 is a flowchart of a third map data processing method performed on a map generation side according to an embodiment of this disclosure.

After the map generation side generates and stores the shadow information, an application that uses the shadow information as an input may be directly run locally, to meet application requirements of a plurality of scenarios. FIG. 9 is a map data processing method for running an application on the map generation side based on the shadow information, and the method includes step 901 to step 903. Step 901 is the same as step 601, and step 902 is the same as step 602. Details are not described herein again.

Step 903: Run an application based on the shadow information. The application is installed on an apparatus on the map generation side. Because the map generation side has a data processing capability, after the shadow information is generated on the map generation side and stored as the map data, the shadow information may be further locally used as an input to run the application, to meet requirements for the shadow information in a plurality of scenarios. For a plurality of data processing manners and a plurality of data processing results of the shadow information based on a plurality of requirements, refer to the following specific description of each application scenario.

For example, when the map generation side is a vehicle, a map database including the shadow information is maintained in the vehicle. An application installed on the vehicle may read the shadow information from the map database, and then input the shadow information into a preset algorithm module for data processing. An obtained data processing result may meet a plurality of requirements of a user, such as driver assistance, route planning, or parking assistance.

For another example, when the map generation side is a cloud server, a map database including the shadow information is maintained in the cloud server. An application installed on the cloud server may read the shadow information from the map database, and then input the shadow information into a preset algorithm module for data processing. An obtained data processing result may be used to provide various cloud services for a user.

The map generation side may further provide various services to another device through information interaction based on the shadow information that is locally generated and stored as the map data. For example, when the map generation side is a cloud server, the cloud server may provide a cloud service for a user in a form of sending service response information to a terminal side device or a roadside device in response to service request information received from the terminal side device or the roadside device. A device receiving the service may be limited to a device authenticated by the map generation side. For example, the device receiving the service is required to be authenticated or is required to pay.

Figure 10:
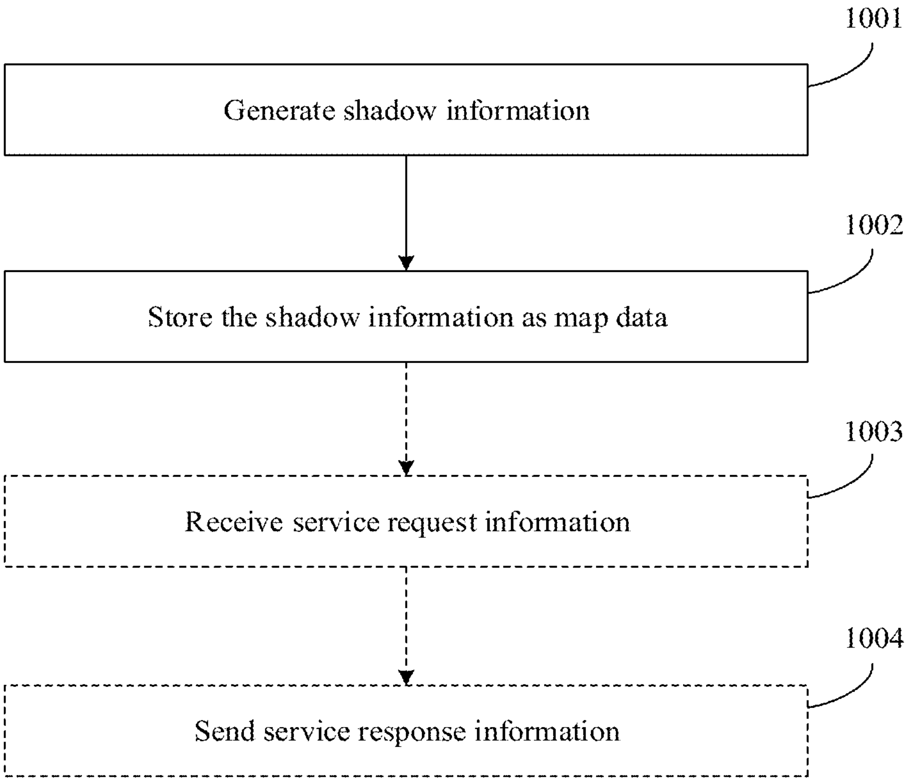
FIG. 10 is a flowchart of a fourth map data processing method performed on a map generation side according to an embodiment of this disclosure.

FIG. 10 is a map data processing method used by the map generation side to provide a service externally, and the method includes step 1001 to step 1004. Step 1001 is the same as step 601, and step 1002 is the same as step 602. Details are not described herein again.

Step 1003: Receive service request information. Step 1004: Send service response information, where the service response information is generated based on the service request information and the shadow information. Based on different application scenarios, the service request information and the service response information have different content. The following uses several different application scenarios as examples for description.

(1) When the Service is a Target Recognition Service:

The service request information includes sensing information that is about a target object and that is obtained by the terminal side device or the roadside device through sensing. The service response information includes target indication information. The target indication information indicates an attribute of the target object. The attribute of the target object includes but is not limited to a category of the target object, a name of the target object, an outline of the target object, a color of the target object, a pattern of the target object, or whether the target object is stereoscopic.

(2) When the Service is a Driver Assistance Service:

The service request information includes driving data of the vehicle. The driving data includes in-vehicle data and/or outside-vehicle data. The in-vehicle data indicates a vehicle status such as a speed, acceleration, a driving mileage, residual energy, torque, or an engine temperature of the vehicle. The outside-vehicle data indicates a driving environment of the vehicle, such as a location of the vehicle, a slope of a road, a radian of a bend, a friction coefficient of a road surface, or a distance to a vehicle in front of the vehicle, and the data outside the vehicle may be sensing data sensed by a sensing device such as a camera, a lidar, or a millimeter wave radar that is installed on the vehicle. The service response information includes reminder information for the user, for example, reminding the user that the vehicle is about to enter a shadow region, or includes decision control information for the vehicle, where the decision control information is used to control the vehicle to perform steering, acceleration, braking, or the like.

(3) When the Service is a Parking Space Recommendation Service:

The service request information is used to provide a parking requirement of the user, for example, at least one of an estimated parking region, a parking start time, a parking end time, and parking duration. The service response information includes parking space recommendation information. The parking space recommendation information indicates at least one parking space recommended to the user. Further, when a plurality of parking spaces are recommended to the user, the parking space recommendation information further indicates a priority order of the plurality of parking spaces.

(4) When the Service is a Navigation Service:

The service request information includes travel information of the user, such as a departure point, a destination, a travel time, a travel policy, or a travel mode (such as walking, cycling, or driving, or a driving mode, such as autonomous driving or manned driving or assisted driving). The service response information recommends at least one route to the user, and the at least one route can meet a requirement that the user wants to be exposed to the sun as much as possible (or to be exposed to the sun as long as possible) or avoid being exposed to the sun as much as possible (or to be exposed to the sun as short as possible). Further, the service response information further includes sun exposure information of each of the at least one route, for example, length of a sun-baked/sun-protected road section, sun-baked/sun-protected duration, a ratio of a length of a sun-baked/sun-protected road section to a length of a total route, or a ratio of duration of passing through a sun-baked/sun-protected road section to duration of passing through a total route. Further, the service response information further includes cost information of another aspect of each of the at least one route, such as time costs, fuel consumption costs, labor costs, or toll costs. Alternatively, further, when the route recommended to the user is a plurality of paths including the at least one route, the service response information may further indicate a priority order of the plurality of routes based on a travel policy (such as most sun-protected, shortest distance, shortest time, or most fuel-efficient) entered by the user.

(5) When the Service is a Car Hailing Service:

The service request information includes travel information of the user, for example, a departure place, a destination, a travel time, or a travel mode. In addition to recommending a rental operation vehicle (manned driving or unmanned driving) to the user, the service response information further recommends, to the user, a pick-up point or a drop-off point at which sun exposure is avoided as much as possible.

(6) When the Service is a Solar Energy Charging Service:

The service request information indicates a remaining power of the vehicle, a planned trip of the user, a region in which the vehicle is located, or the like. The service response information is used to recommend, to the user, a driving route used for charging while driving or a parking location used for charging while stationary.

Figure 11:
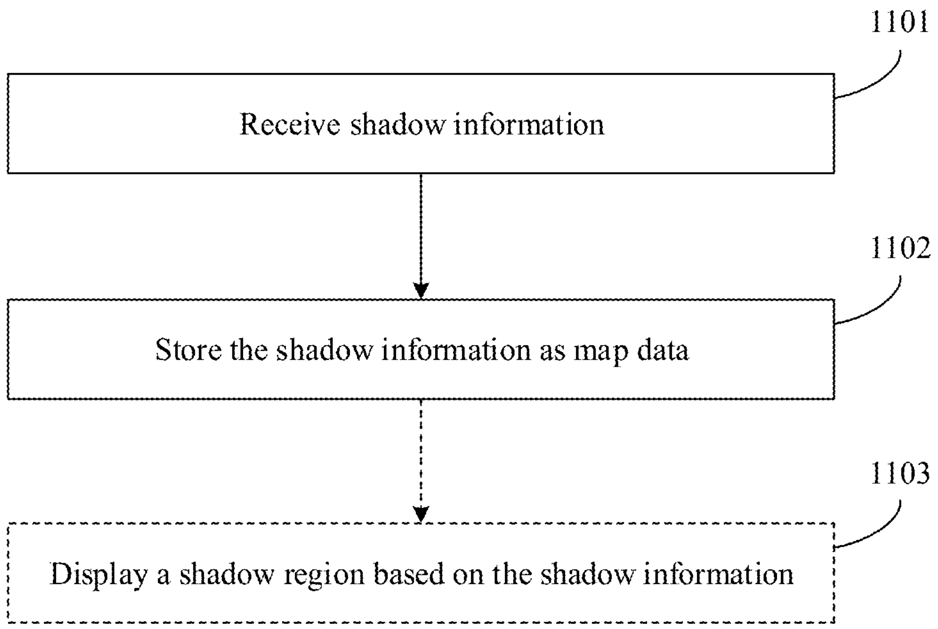
FIG. 11 is a flowchart of a fifth map data processing method performed on a map receiving side according to an embodiment of this disclosure.
Figure 12A:
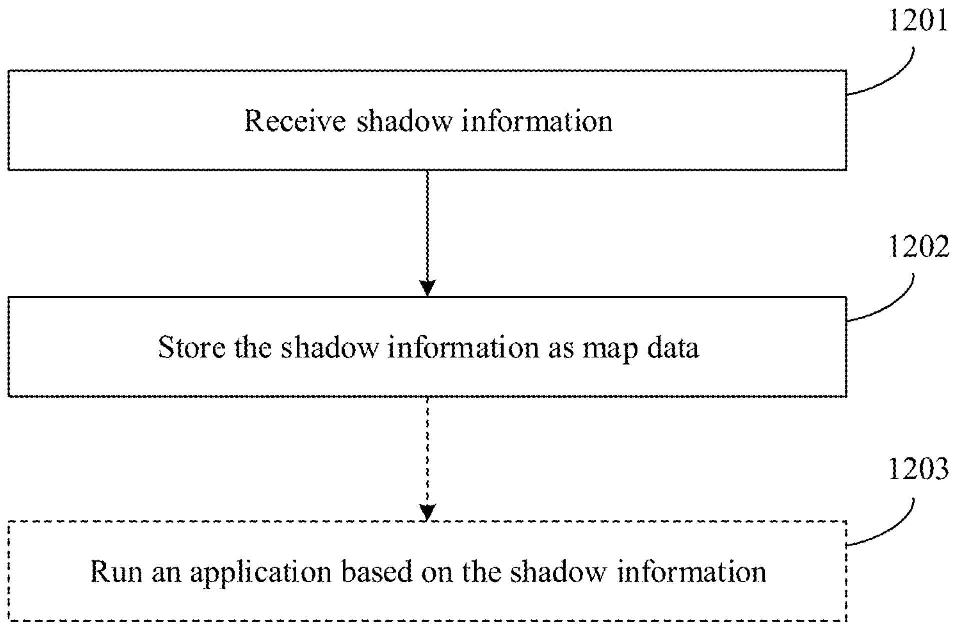
FIG. 12A is a flowchart of a sixth map data processing method performed on a map receiving side according to an embodiment of this disclosure.
Figure 12B:
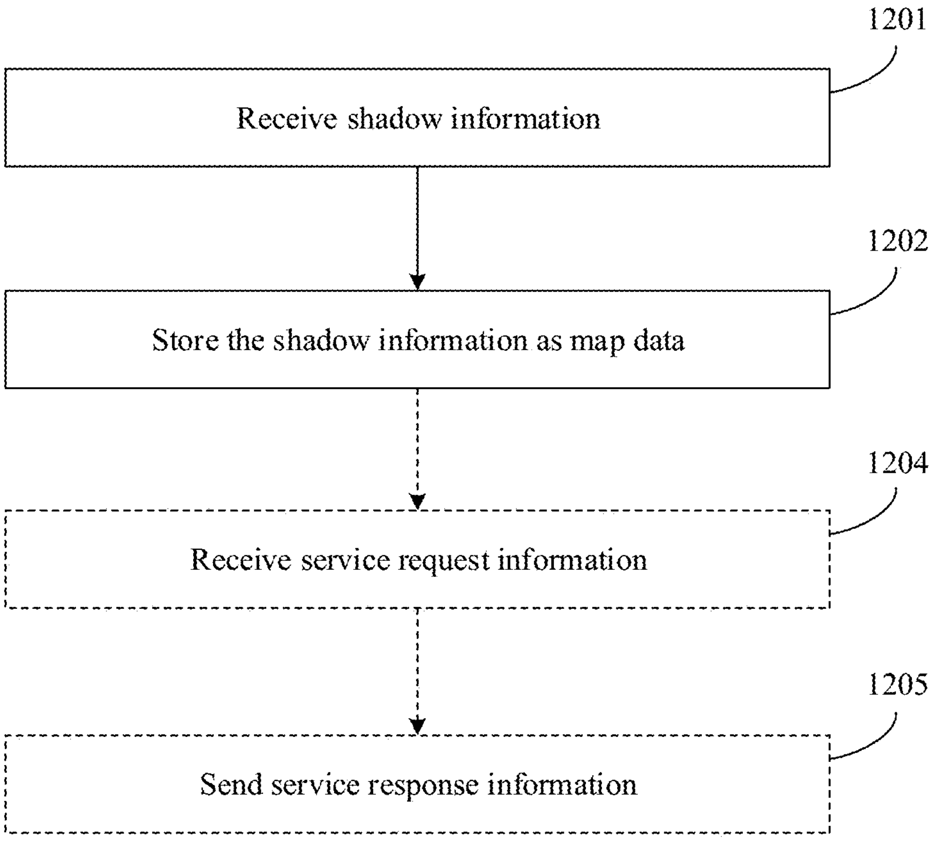
FIG. 12B is a flowchart of a seventh map data processing method performed on a map receiving side according to an embodiment of this disclosure.

FIG. 11, FIG. 12A, and FIG. 12B describe flowcharts of three map data processing methods performed on a map receiving side, and these methods are further extended based on the map data processing method (an implementation of obtaining the shadow information by receiving the shadow information) shown in FIG. 6 to meet requirements of different map use scenarios.

When the map receiving side has a display capability, the map receiving side may further perform an operation of displaying the shadow region. FIG. 11 is a map data processing method for displaying shadow information on a map receiving side, which includes step 1101 to step 1103. Step 1101 is the same as step 601, and step 1102 is the same as step 602. Details are not described herein again.

Step 1103: Display a shadow region based on the shadow information. The displaying includes but is not limited to displaying on a display in the map receiving side or displaying through external projection. The display interface of the shadow region is described in detail later.

For example, when the map receiving side is a vehicle, a map drawn with the shadow region may be displayed on a central control screen of the vehicle, or a laser image of the shadow region may be projected on a front windshield based on a HUD, so that a projection image is superimposed on a physical scene seen through the windshield.

After the map receiving side receives and stores the shadow information, an application that uses the shadow information as input may be run locally, to meet application requirements of a plurality of scenarios. FIG. 12A is a map data processing method for running an application on a map receiving side based on shadow information, which includes step 1201 to step 1203. Step 1201 is the same as step 601, and step 1202 is the same as step 602. Details are not described herein again.

Step 1203: Run an application based on the shadow information. The application is installed on an apparatus on the map receiving side. When the map receiving side has a data processing capability, the received shadow information may be used as an input to run an application, to meet requirements for the shadow information in a plurality of scenarios. For a plurality of data processing manners and a plurality of data processing results of the shadow information based on a plurality of requirements, refer to the following specific description of each application scenario.

For example, when the map receiving side is a vehicle, the vehicle generates a local map database based on map information obtained from a server, and stores shadow information in the map database. An application installed on the vehicle may read the shadow information from the map database, and then input the shadow information into a preset algorithm module for data processing. An obtained data processing result may meet a plurality of requirements of a user, such as driver assistance, route planning, or parking assistance.

For another example, when the map receiving side is an application server, the application server maintains, based on map data that includes shadow information and that is received from a map server, a map database including the shadow information. The application server may read the shadow information from the map database, and then input the shadow information into a preset algorithm module for data processing. An obtained data processing result may be used to provide various application services for a user.

The map receiving side may further provide a third-party application service for another device through information interaction based on the received shadow information. For example, when the map receiving side is a travel application server deployed by a travel service provider, the travel service provider purchases a map from a map manufacturer, so that the travel application server receives map data from the map server (where the map server is deployed by the map manufacturer and is used to produce a map), where the map data includes shadow information. Then the travel application server may provide a travel application service to the user in a form of sending service response information to a terminal side device or a roadside device in response to service request information received from the terminal side device or the roadside device.

FIG. 12B is a map data processing method used by a map receiving side to provide a service externally. The method includes a step 1201, a step 1202, a step 1204, and a step 1205. Step 1201 is the same as step 601, and step 1202 is the same as step 602. Details are not described herein again.

Step 1204: Receive service request information. Step 1205: Send service response information, where the service response information is generated based on the service request information and the shadow information. Based on different application scenarios, the service request information and the service response information have different content. For details, refer to the foregoing description of six scenarios in which the service is respectively the target recognition service, the assisted driving service, the parking space recommendation service, the navigation service, the car hailing service, or the solar energy charging service.

The following describes a method for displaying shadow information on a map based on FIG. 13 to FIG. 17. A medium or a device used for display is not limited in embodiments of this disclosure. The displaying includes but is not limited to projection displaying or displaying on a display for display.

Figure 13:
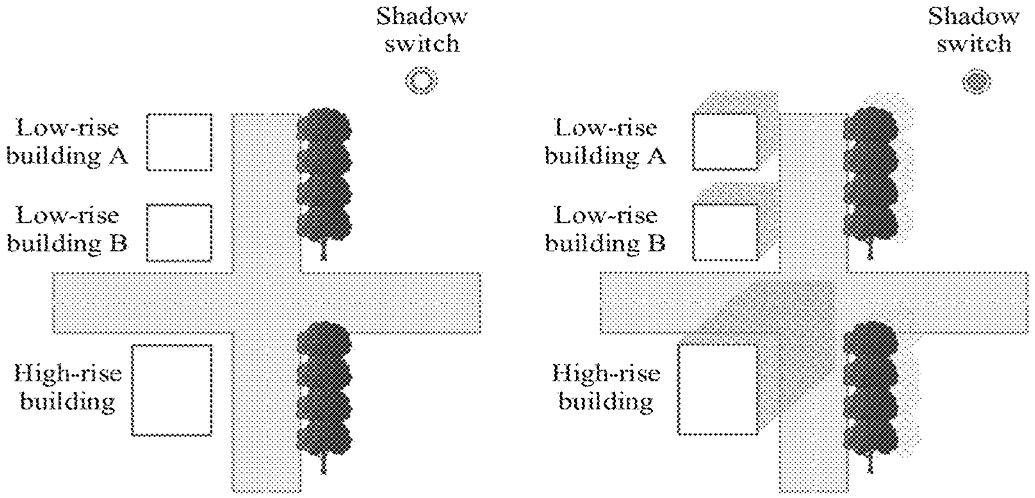
FIG. 13 is a schematic diagram of displaying shadow information on a map based on a user selection according to an embodiment of this disclosure.
Figure 14:
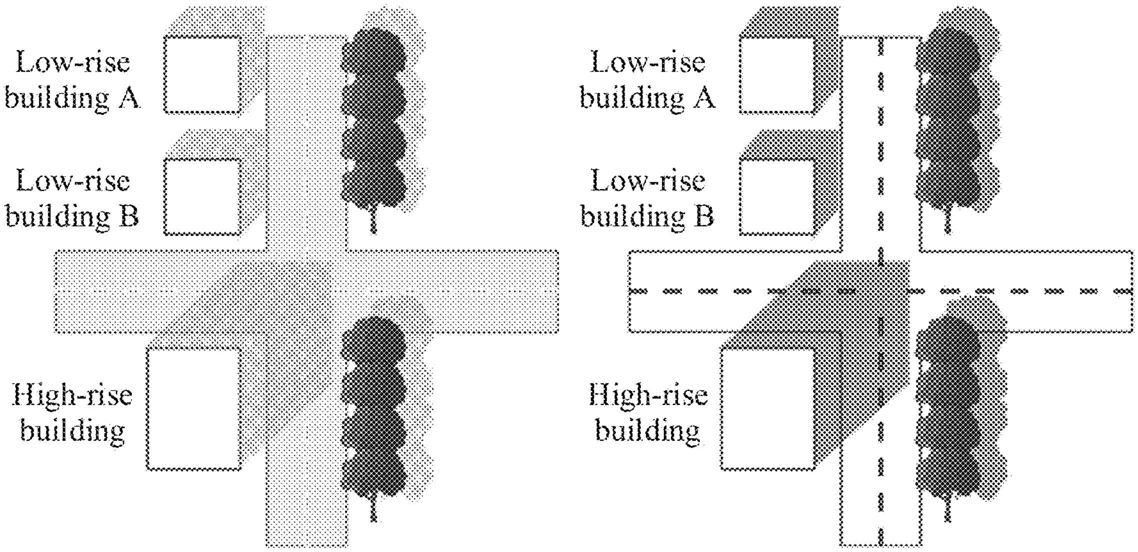
FIG. 14 is a schematic diagram of distinctively displaying a shadow region and another region according to an embodiment of this disclosure.
Figure 15:
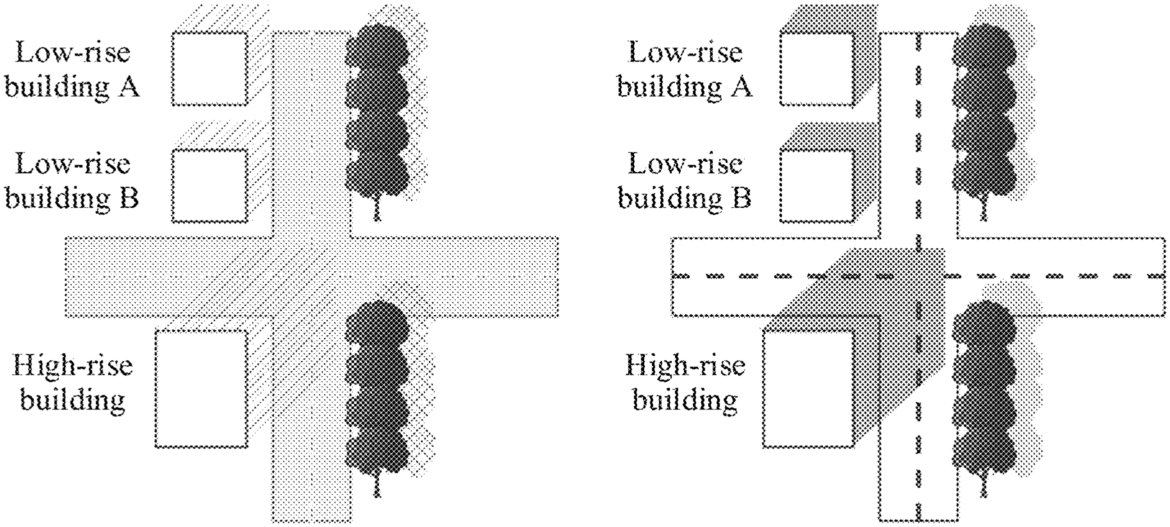
FIG. 15 is a schematic diagram of distinctively displaying different shadow information on a map according to an embodiment of this disclosure.

On the map, whether to display the shadow information may be optional, and whether the shadow information and other information in the map are superimposed for display is determined based on a user input. A user may set, on a setting interface of a map application, whether to display the shadow information, or more conveniently, a trigger instruction for displaying the shadow information may be generated based on the user input, so that the user can display or cancel displaying the shadow information at any time more conveniently. The user input includes but is not limited to character input, voice input, gesture input, or input of a touch screen of the user. In FIG. 13, as an example, a shadow switch is set on a map display interface, and a user may touch the shadow switch on a screen by using a finger, to disable the shadow switch and not display the shadow information in a left figure in FIG. 13, or to enable the shadow switch in a right figure in FIG. 13 and display the shadow information on a map in a superimposed manner.

When the shadow information is displayed in the superimposed manner, to distinguish a shadow region from a non-shadow region, a display region corresponding to the shadow region may have different grayscales, colors, saturation, or superimposed patterns relative to another display region. For example, in a left figure of FIG. 14, shadow regions of buildings and trees on a ground are indicated by a grid pattern. In a right figure of FIG. 14, shadow regions of buildings and trees on a ground are indicated by a darker color.

As described above, the shadow information may also indicate a cause of the shadow region, such as a projection of a building under sunlight, a light spot of a leaf, a ceiling cover, a cloud cover, or a tunnel or a culvert. For example, on a premise that a pattern is used to indicate a shadow region (no pattern is used to indicate a non-shadow region), in a left figure of FIG. 15, a slash pattern is used to indicate a shadow generated by a building, and a grid line pattern is used to indicate a shadow generated by a tree.

As described above, the shadow information may also indicate a shadow degree. The shadow degree includes but is not limited to an average illumination intensity value of the shadow region, an illumination intensity difference between the shadow region and the non-shadow region, a picture luminance difference between the shadow region and the non-shadow region, a picture contrast between the shadow region and the non-shadow region, and a shadow degree. Shadow regions with shadow degrees can be displayed by using different grayscales, colors, saturation, or pattern densities. For example, on a premise that gray is used to indicate a shadow region (no gray is used to indicate a non-shadow region), since a shadow of a building has a higher shadow degree than a shadow of a tree, in a right figure of FIG. 15, lighter gray is used to indicate a shadow region corresponding to the shadow of the tree, and darker gray is used to indicate a shadow region corresponding to the shadow of the building.

Figure 16A:
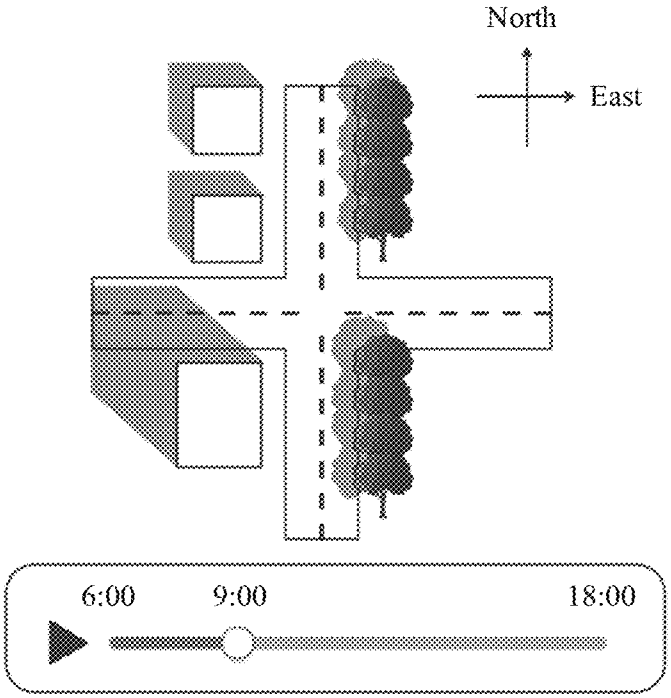
FIG. 16A is a first schematic diagram of dynamically displaying shadow information on a map according to an embodiment of this disclosure.
Figure 16B:
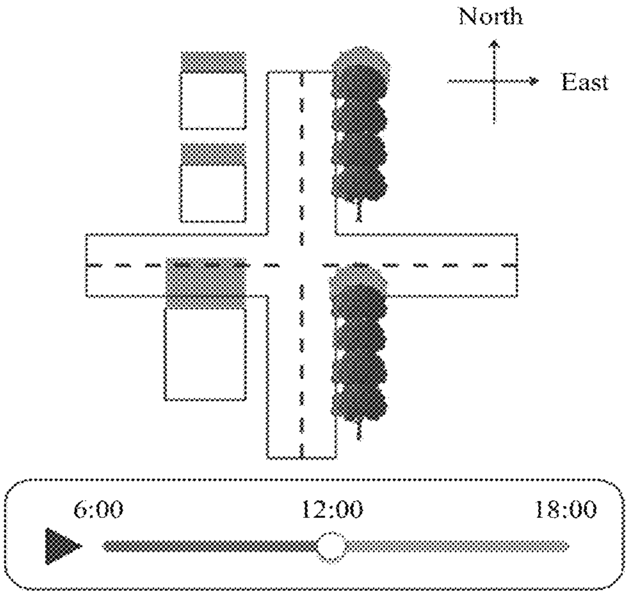
FIG. 16B is a second schematic diagram of dynamically displaying shadow information on a map according to an embodiment of this disclosure.
Figure 16C:
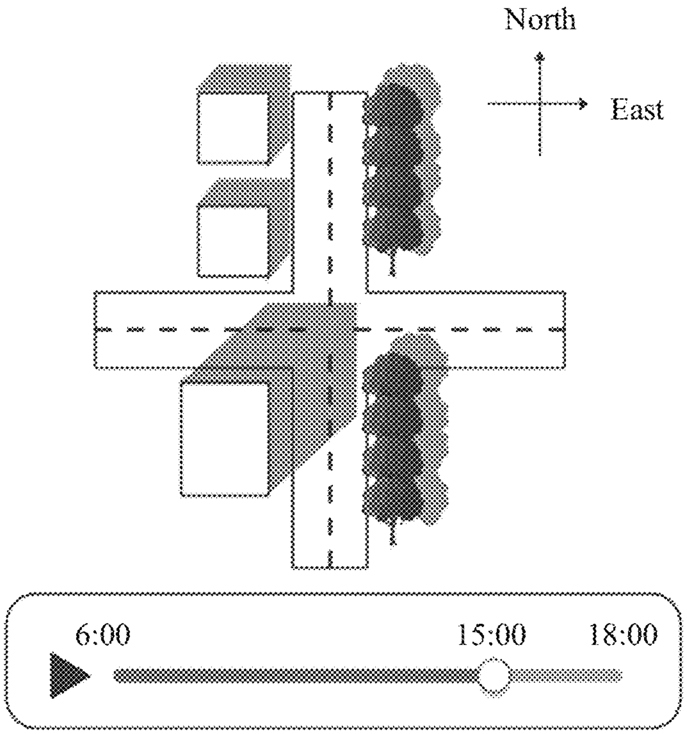
FIG. 16C is a third schematic diagram of dynamically displaying shadow information on a map according to an embodiment of this disclosure.
Figure 17:
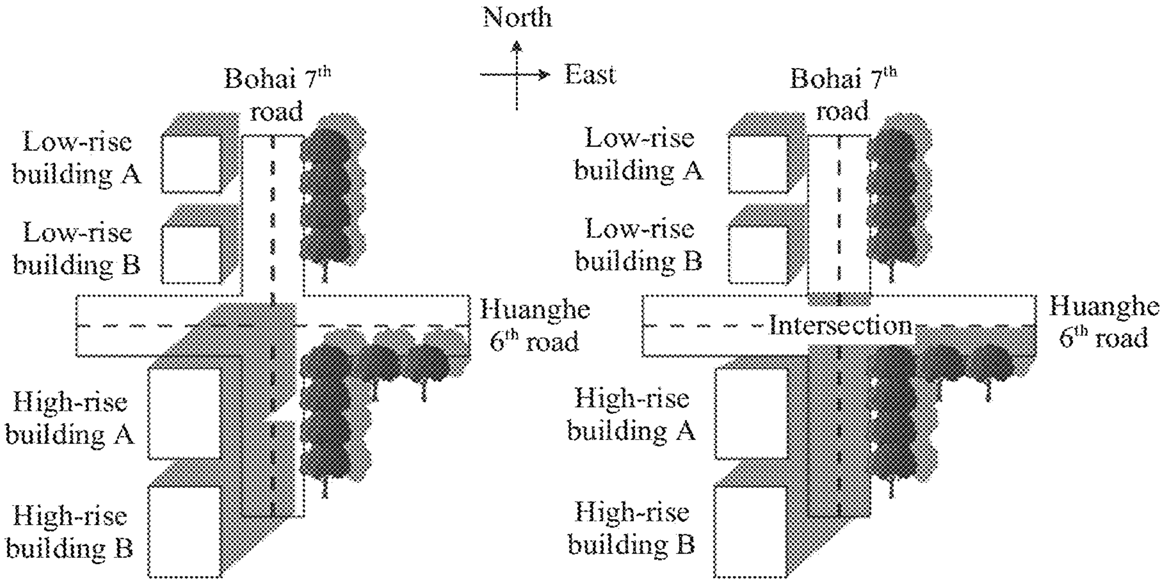
FIG. 17 is a schematic diagram of displaying shadow information with reference to a boundary of a map element according to an embodiment of this disclosure.

As described above, the shadow information may further indicate a time period in which the shadow region exists, and the shadow region also changes with time. Therefore, the shadow information has a dynamic attribute, so that a change of the shadow region with time can be dynamically displayed on a map. For example, a change of a shadow region within a time period may be played in a video form, and a playback speed may be set or adjusted. For another example, a playback progress bar may be set on a display interface, so that a user can choose whether to play a video about a change of a shadow region, or a shadow region at a specific time point may be displayed directly in a form of directly dragging a progress button on the progress bar. FIG. 16A to FIG. 16C illustrate how to dynamically display a shadow region in a region that includes a road, a tree on a side of the road, and a building in a time period from 6:00 a.m. to 18:00 p.m. A user may trigger playing of a dynamic image above a playback progress bar in a display interface by clicking a triangle in the playback progress bar. As the playback progresses, a location of a circular progress button on the playback progress bar moves rightward. In addition, a time point corresponding to a currently played image is displayed on the top of the circular progress button. The user can also directly drag the circular progress button to view a shadow region at a specific time point. An image played in FIG. 16A is a shadow region at 9:00 a.m., and the sun in a southeast direction, so that a shadow of the tree is located on a northwest side of the tree and a shadow of the building is located on a northwest side of the building. An image played in FIG. 16B is a shadow region at noon, and the sun is in a due south direction, so that a shadow of the tree is located on a north side of the tree, and a shadow of the building is located on a north side of the building. An image shown in FIG. 16C is a shadow region at 3:00 p.m., and the sun in a southwest direction, so that a shadow of the tree is located on a northeast side of the tree and a shadow of the building is located on a northeast side of the building.

Based on different requirements, different shadow region boundary display strategies may be adopted. A boundary of a displayed shadow region may be consistent with or similar to a boundary of an actual shadow region, as shown in a left figure of FIG. 17. Consistent with or similar to the boundary of the actual shadow region, a shadow region of the building is a polygon, and a boundary of the corresponding shadow region is formed by straight lines, and a shadow region of the tree is irregular, and a boundary of the corresponding shadow region is formed by irregular curves. In addition, the boundary of the shadow region can be trimmed to facilitate application or data storage. In a trimming manner, the display region of the shadow region on the display interface may be determined based on a location of the shadow region on the map and a boundary condition of another map element in the map. For example, at least a part of the boundary of the shadow region may be trimmed to at least a part of the boundary of a map element that is close to the location of the shadow region. As shown in a right figure of FIG. 17, since shadows of a high-rise building A and a high-rise building B almost cover a section of road southward at an intersection of Bohai $7^{th}$ road and Huanghe $6^{th}$ road, when displaying shadow regions of the high-rise building A and the high-rise building B on a road, a road section of Bohai $7^{th}$ road south from the intersection can be displayed as a shadow region. Since shadows of trees almost cover a west-to-east lane east of the intersection of Bohai $7^{th}$ road and Huanghe $6^{th}$ road, when displaying shadow regions of the trees on a road, a lane section of Huanghe $6^{th}$ road east from the intersection can be displayed as a shadow region.

Figure 18:
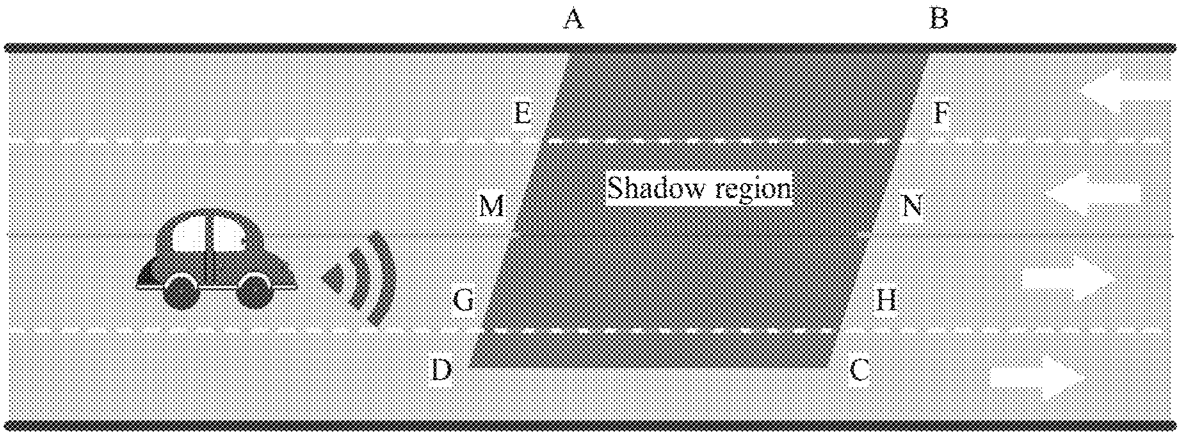
FIG. 18 is a schematic diagram of an application scenario in which shadow information is applied to target recognition according to an embodiment of this disclosure.
Figure 19:
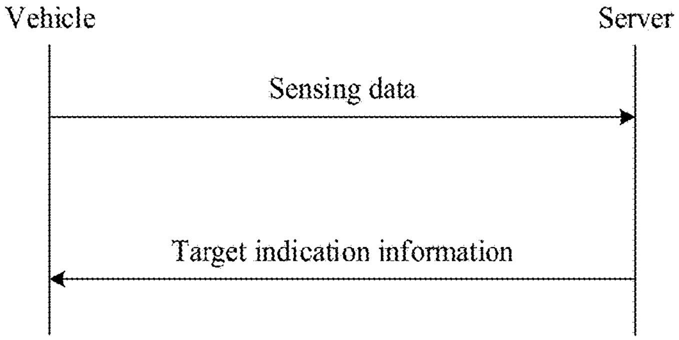
FIG. 19 is an interaction flowchart of applying shadow information to a target recognition cloud service according to an embodiment of this disclosure.

The following describes, based on FIG. 18 and FIG. 19, a method for performing target recognition based on shadow information.

Target recognition is a process of determining that a target object exists in an image collected by a camera, or extracting a feature of the target object. The feature includes but is not limited to an attribute of the target object, such as a category of the target object, a name of the target object, an outline of the target object, a color of the target object, a pattern of the target object, or whether the target object is stereoscopic. An example in which a vehicle driving on a road recognizes a lane line is used in the following for description. A subject performing a target recognition operation and a recognized target object are not limited in embodiments of this disclosure.

With development of vehicle intelligence, a vehicle has an increasingly strong sensing capability when the vehicle is equipped with advanced sensors and processors. For example, a camera installed on a vehicle is used to photograph a surrounding region of the vehicle, and then image data is sent to an image processor for computing and processing. The vehicle may identify another vehicle, a pedestrian, a building, a traffic sign, an obstacle, or the like on a road, to provide important support for intelligent driving. However, due to factors such as a complex environment, insufficient camera precision, limited processor computing power, or insufficient sample size for machine learning, a problem of target recognition error sometimes occurs in a process of intelligent driving, which greatly threatens driving safety.

Embodiments of this disclosure provide a target recognition method based on shadow information. The method may be performed by a device in a terminal, a roadside, or a cloud, which includes but is not limited to a vehicle, a portable terminal, an RSU, an REC, a map server, or an application server. Alternatively, the method may be performed by an application installed on a device in a terminal, a roadside, or a cloud.

In FIG. 18, in a driving process, a vehicle continuously recognizes a lane line in front of the vehicle, for example, recognizes an attribute such as a color of the lane line, or whether the lane line is a dotted line or a solid line. It can be seen that a shadow region ABCD appears in front of the vehicle. In the shadow region, there are two lane lines EF and GH that are represented by dotted lines and that indicate lane boundaries, and there is also a lane line MN that is represented by a yellow line and that indicates a boundary between two roads in different driving directions. In the shadow region, colors of a road surface and the lane lines change greatly compared with a non-shadow region. This change increases difficulty in target recognition, and may cause the vehicle to incorrectly determine an attribute of the lane line in the shadow region. In embodiments of this disclosure, shadow information used to indicate the shadow region is used as input reference information during target recognition. For example, based on a map information reference of the shadow region ABCD, a target recognition device compensates for a hue of an image part corresponding to the region ABCD, so that target recognition accuracy can be effectively provided.

The vehicle can obtain a target recognition result in the following two ways:

(1) When the vehicle has a map including shadow information (where the shadow information is generated or received by the vehicle) in a memory of the vehicle and the vehicle has a strong data processing capability, the vehicle may perform target recognition based on shadow information stored in the vehicle and by using a processor configured by the vehicle. In other words, based on prior information such as a location of the shadow information indicated in the map, according to a preconfigured image processing algorithm, an image processor mounted in the vehicle first performs calculation processing, for example, color compensation or luminance compensation, on a part of the image corresponding to the region ABCD in a picture taken by a vehicle-mounted camera, and eliminates an influence of the shadow on the image. Then, according to a common lane line recognition algorithm, the image on which the influence of the shadow is eliminated is processed, to obtain a more accurate target recognition result.

(2) When no map including shadow information is configured for the vehicle or the vehicle does not have a strong data processing capability, the vehicle may obtain a target recognition result by receiving a target recognition service provided by an application server deployed on a cloud. For specific steps, refer to FIG. 19.

First, a vehicle sends information containing sensing data to a server. The sensing data may be obtained through sensing by a sensor configured on the vehicle, or may be received by the vehicle from another device (for example, another vehicle, a mobile phone, or a roadside device). The sensing data includes but is not limited to image data captured by a camera.

Then, after receiving the information including the sensing data, the server feeds back target indication information to the vehicle, where the target indication information indicates whether a target object exists or indicates a feature of a target object. The feature includes, but is not limited to, an attribute such as a category of the target object, a name of the target object, an outline of the target object, a color of the target object, a pattern of the target object, or whether the target object is stereoscopic. For a scenario of lane line recognition in this embodiment, the sensing data may be a picture that includes a lane line of a front road section and that is taken by a vehicle-mounted camera. Because a map including shadow information is stored in the server, and the data processing capability of the server is strong, the server may use the prior information, such as the location of the shadow information indicated in the map, according to the preconfigured image processing algorithm, to perform operation processing, such as color compensation or luminance compensation, on a part of the image corresponding to the region ABCD in the picture on the image processor configured internally, and eliminate the influence of the shadow on the image. Then, the server performs operation processing on the picture on which the influence of the shadow is eliminated according to a common lane line recognition algorithm, to obtain a more accurate target recognition result, for example, information such as whether the front lane line is a solid line or a dotted line, whether the front lane line is white or yellow, or whether there is a lane line indicating lane combination.

Optionally, after receiving the target indication information, the vehicle may make a driving decision based on whether the target object indicated by the target indication information exists or a feature of the target object, for example, whether to change a lane or whether to decelerate.

Figure 20:
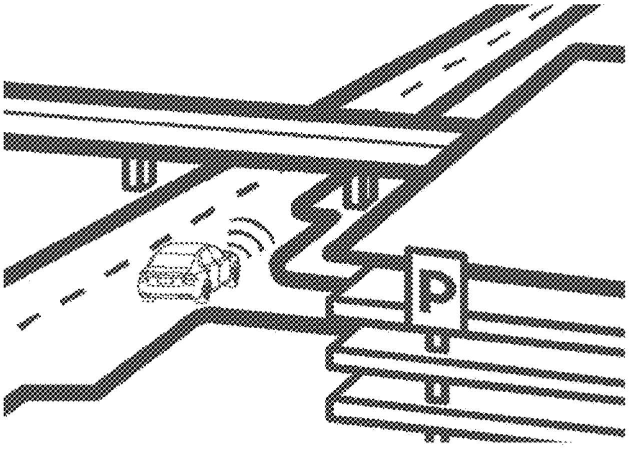
FIG. 20 is a schematic diagram of an application scenario in which shadow information is applied to assisted driving according to an embodiment of this disclosure.
Figure 21A:
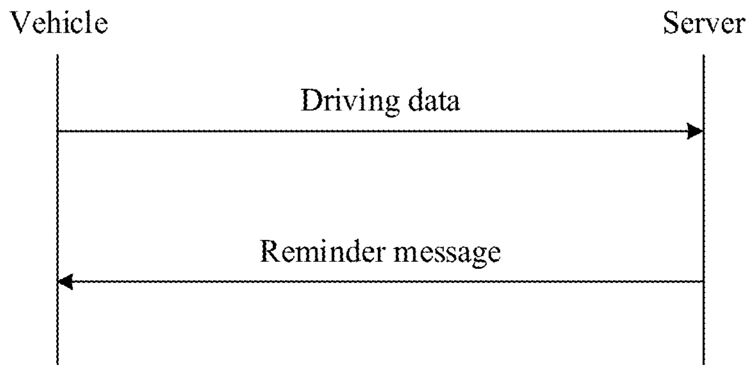
FIG. 21A is a first interaction flowchart of applying shadow information to an assisted driving cloud service according to an embodiment of this disclosure.
Figure 21B:
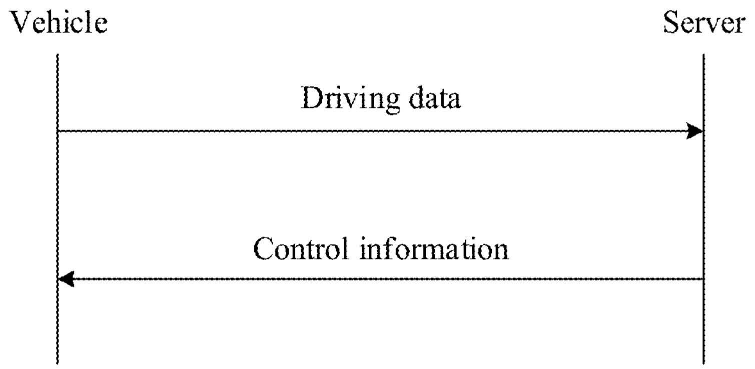
FIG. 21B is a second interaction flowchart of applying shadow information to an assisted driving cloud service according to an embodiment of this disclosure.

The following describes a method for assisting driving based on shadow information with reference to FIG. 20, FIG. 21A, and FIG. 21B.

Because light in a shadow region is weak, there may be safety hazards when a vehicle enters a shadow region under a bridge, a culvert, a tunnel, or the like, and specific driver assistance operations can be performed, such as turning on a headlight, reducing a speed, or warning a pedestrian. An embodiment of this disclosure provides a method for assisting driving based on shadow information, to assist driving behavior in a dark environment more intelligently, accurately, and timely, to improve driving safety. The driving includes but is not limited to intelligent assisted driving in which a human driver participates or unmanned driving.

An embodiment of this disclosure provides a method for assisting driving based on shadow information. The method may be performed by a device in a terminal, a roadside, or a cloud, which includes but is not limited to a vehicle, a portable terminal, an RSU, an REC, a map server, or an application server. Alternatively, the method may be performed by an application installed on a device in a terminal, a roadside, or a cloud.

The following uses a scenario in which a vehicle is about to drive under a viaduct shown in FIG. 20 as an example for description, and the following two implementations are included.

In a first implementation, the vehicle is configured with a map including shadow information by generating or receiving the shadow information, and the vehicle is further configured with a positioning system (including but not limited to a GNSS, inertial navigation, or a wheel speedometer).

The vehicle first obtains a location of the vehicle by using the positioning system, and then determines a distance of the vehicle relative to a shadow region with reference to a geographical location that is of the shadow region and that is indicated by the shadow information. Alternatively, the vehicle may calculate a time interval from a current time point to a time point when the vehicle enters the shadow region with reference to driving status information such as a current vehicle speed or an acceleration of the vehicle.

The vehicle determines, based on the foregoing determined distance or the foregoing calculated time interval, that the vehicle is about to enter the shadow region. Further, for example, the vehicle may determine, based on the foregoing time interval, that the vehicle is about to enter the shadow region within a time less than a first threshold, or determine, based on the foregoing determined distance, that the distance between the vehicle and the shadow region in front of a driving direction of the vehicle is less than a second threshold.

After determining that the vehicle is about to enter the shadow region, the vehicle may perform a plurality of operations used to assist driving in the shadow region. The plurality of operations may be classified into two types. A first type is a reminder operation, which includes but is not limited to reminding a user in the vehicle to decelerate, turn on a headlight, turn on a warning light, or sound a whistle. A second type is a control operation, which includes but is not limited to controlling the vehicle to slow down, turn on a headlight, turn on a warning light or sound the horn.

In a second implementation, no map including shadow information is configured in the vehicle, and the vehicle may receive a cloud service used to assist driving in the shadow region from a map server or an application server. For an interaction process between the vehicle and the server, refer to FIG. 21A and FIG. 21B. A map including shadow information is configured in the server.

FIG. 21A illustrates an interaction manner in which a server reminds a vehicle of a driving behavior based on a cloud service, and includes the following steps.

Step 1: The vehicle sends driving data to the server. The driving data may indicate a location of the vehicle, or may further indicate a driving status of the vehicle, such as a driving speed or an acceleration.

Step 2: The server returns a reminder message to the vehicle. The server may determine the location of the vehicle based on the driving data received from the vehicle, and then determine a distance of the vehicle relative to a shadow region with reference to a geographical location that is of the shadow region and that is indicated by the shadow information. Alternatively, the vehicle may calculate a time interval from a current time point to a time point when the vehicle enters the shadow region with reference to driving status information such as a current vehicle speed or an acceleration of the vehicle. The server determines, based on the foregoing determined distance or the foregoing calculated time interval, that the vehicle is about to enter the shadow region. Further, for example, the server may determine, based on the foregoing time interval, that the vehicle is about to enter the shadow region within a time less than a first threshold, or determine, based on the foregoing determined distance, that the distance between the vehicle and the shadow region in front of a driving direction of the vehicle is less than a second threshold. After determining that the vehicle is about to enter the shadow region, the server sends the reminder message to the vehicle. A purpose of the reminder message includes but is not limited to reminding the vehicle to decelerate, turn on a headlight, turn on a warning light, or sound a horn.

FIG. 21B illustrates an interaction manner in which a server controls a vehicle based on a cloud service, and includes the following steps.

Step 1: The vehicle sends driving data to the server. The driving data may indicate a location of the vehicle, or may further indicate a driving status of the vehicle, such as a driving speed or an acceleration.

Step 2: The server returns control information to the vehicle. The server may determine the location of the vehicle based on the driving data received from the vehicle, and then determine a distance of the vehicle relative to a shadow region with reference to a geographical location that is of the shadow region and that is indicated by the shadow information. Alternatively, the vehicle may calculate a time interval from a current time point to a time point when the vehicle enters the shadow region with reference to driving status information such as a current vehicle speed or an acceleration of the vehicle. The server determines, based on the foregoing determined distance or the foregoing calculated time interval, that the vehicle is about to enter the shadow region. Further, for example, the server may determine, based on the foregoing time interval, that the vehicle is about to enter the shadow region within a time less than a first threshold, or determine, based on the foregoing determined distance, that the distance between the vehicle and the shadow region in front of a driving direction of the vehicle is less than a second threshold. After determining that the vehicle is about to enter the shadow region, the server sends the control information to the vehicle. A purpose of the control information includes but is not limited to controlling the vehicle to perform an operation, such as decelerating, turning on a headlight, turning on a warning light, or sounding a horn.

The following describes a method for recommending a parking space based on shadow information with reference to FIG. 22 to FIG. 27.

When parking, many users want the vehicle to park in a shadow to avoid sun exposure to the vehicle, to improve comfort of driving the vehicle and avoid aging of vehicle components or release of toxic gases in the vehicle caused by sun exposure. Shadow information in s map is used to recommend the parking space in the shadow to the user, so that the foregoing use requirements of the user can be met. In a specific implementation, an application or a device having a function of recommending a parking space to the user may use some data related to the shadow information in the map, and use the shadow information as an input when a parking space recommendation algorithm is executed.

An embodiment of this disclosure provides a method for recommending a parking space based on shadow information. The method may be performed by a device in a terminal, a roadside, or a cloud, which includes but is not limited to a vehicle, a portable terminal, an RSU, an REC, a map server, or an application server. Alternatively, the method may be performed by an application installed on a device in a terminal, a roadside, or a cloud.

In one case, the application having the function of recommending a parking space to the user may be a pre-installed application in the terminal device before delivery, or may be installed in the terminal device after delivery. The terminal device includes but is not limited to a vehicle, a mobile phone, a notebook computer, a tablet computer, a navigator, or an intelligent wearable device. The terminal device selects, based on the shadow information in the map, a parking space in the shadow region from a plurality of parking spaces, and recommends the parking space to the user. The map including the shadow information is stored in the terminal device.

In another case, the application having the function of recommending a parking space to the user may be installed on a server, such as a map server or an application server, and the server recommends a parking space in a shadow to the vehicle in a form of providing a cloud service to the vehicle. The server selects, based on the shadow information in the map, a parking space in the shadow region from a plurality of parking spaces, and recommends the parking space to the user. The server further stores the map including the shadow information.

Figure 22:
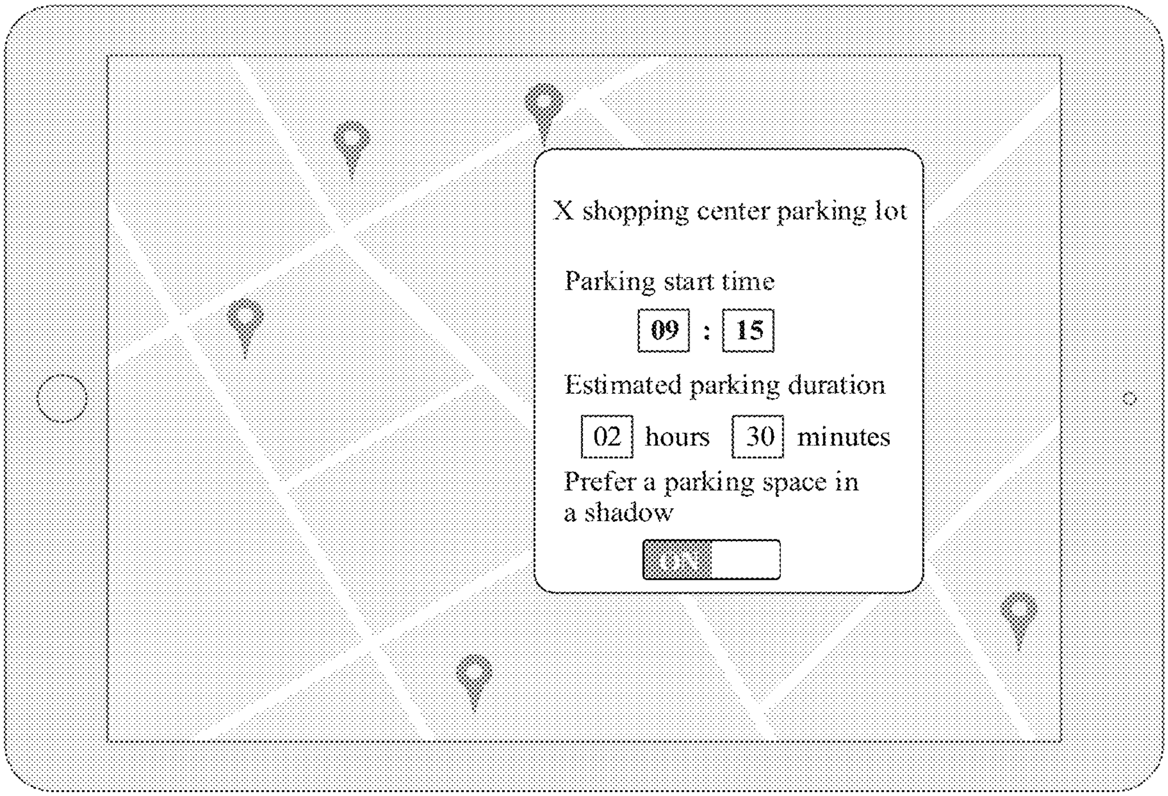
FIG. 22 is a schematic diagram of a user input interface on which shadow information is applied to a parking space searching application according to an embodiment of this disclosure.

Regardless of either of the foregoing two cases, the application or the device having the function of recommending a parking space to the user obtains parking requirement information of the user in advance, where the parking requirement information indicates at least one of an estimated parking region, a parking start time, a parking end time, and parking duration. At least a part of content in the parking requirement information may be obtained through a user input. For example, as shown in FIG. 22, all parking spaces in a displayed map region or all parking lots with an available parking space are marked on a map displayed on a screen. After the user taps a mark of a parking lot, a dialog box for the user to input parking requirement information is popped up on the screen. The dialog box displays a name "X shopping center parking lot" of the parking lot selected by the user, displays a character input box for the user to input a parking start time and estimated parking duration, and further displays a selection button for the user to select whether a parking space in a shadow is preferred. At least a part of the content in the parking requirement information may be obtained by an application invoking output of another module or interface. For example, the application having a function of recommending a parking space to the user invokes information such as a user destination, a departure time, or an estimated arrival time in a navigation application, and uses the information from the navigation application as the parking requirement information of the user for determining the parking space recommended to the user. At least a part of the content in the parking requirement information may be further obtained through calculation by using an application or a device having a function of recommending a parking space to the user. For example, the application or the device that recommends a parking space to the user obtains parking charging modes of a plurality of parking lots within a specific scope, determines, through calculation, a parking lot that is most economical for the user in the plurality of parking lots, and use the parking lot as an estimated parking region for further determining a parking space in the parking lot that is recommended to the user. The foregoing manners for obtaining the parking requirement information may also be combined. For example, a part of the parking requirement information is obtained through a user input, and a part of the parking information is obtained by invoking another module. For another example, a part of the parking requirement information is obtained through a user input, a part of the parking information is obtained by invoking another module, and a part of the parking requirement information is obtained through calculation by the application that recommends a parking space to the user.

For example, FIG. 23 to FIG. 26 illustrate a display interface for recommending a parking space to a user.

Figure 23:
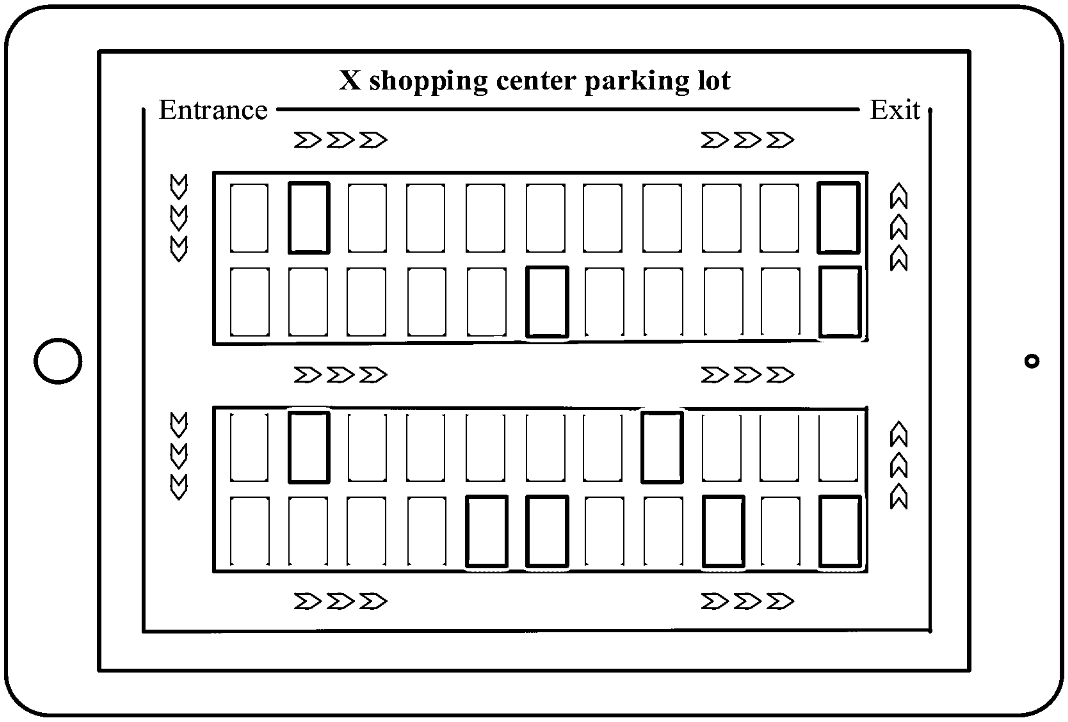
FIG. 23 is a schematic diagram of a first interface used to recommend a sun-protected parking space in an application according to an embodiment of this disclosure.
Figure 24:
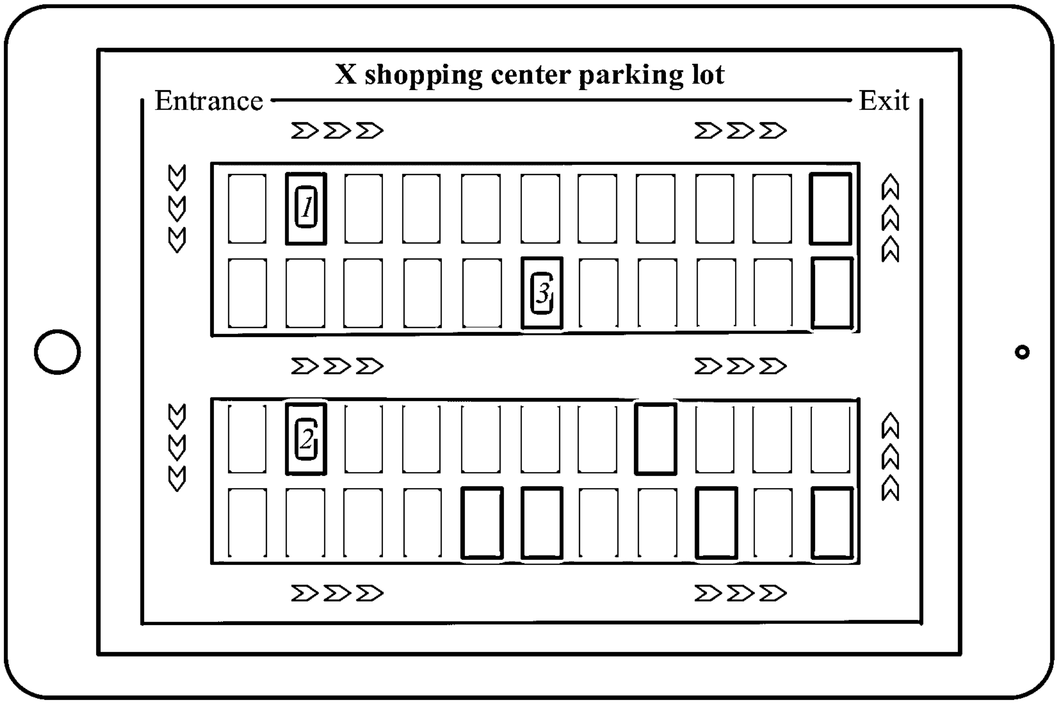
FIG. 24 is a schematic diagram of a second interface used to recommend a sun-protected parking space in an application according to an embodiment of this disclosure.

In FIG. 23, an occupied parking space is represented by a light gray rectangular pattern without a border, and an available parking space is represented by a rectangular pattern with a border. In the rectangular pattern with a border, a rectangular pattern filled with dark gray represents a parking space currently in a shadow, or represents a parking space partially or completely in the shadow within a parking time period required by the user. A rectangular pattern filled with white represents a parking space that is not currently in the shadow, or represents a parking space that is partially or completely not in the shadow within a parking time period required by the user.

When there is a plurality of parking spaces recommended to the user, priority sorting may be performed on the plurality of recommended parking spaces based on a preset policy, and a priority order of the plurality of parking spaces are displayed on a display interface. For example, in FIG. 24, three parking spaces are recommended to the user, Arabic numerals "1", "2" or "3" are marked on three rectangular patterns that are filled with dark gray and that are with a border for representing the three parking spaces, and these Arabic numerals indicate a priority order of the corresponding parking spaces.

Figure 25:
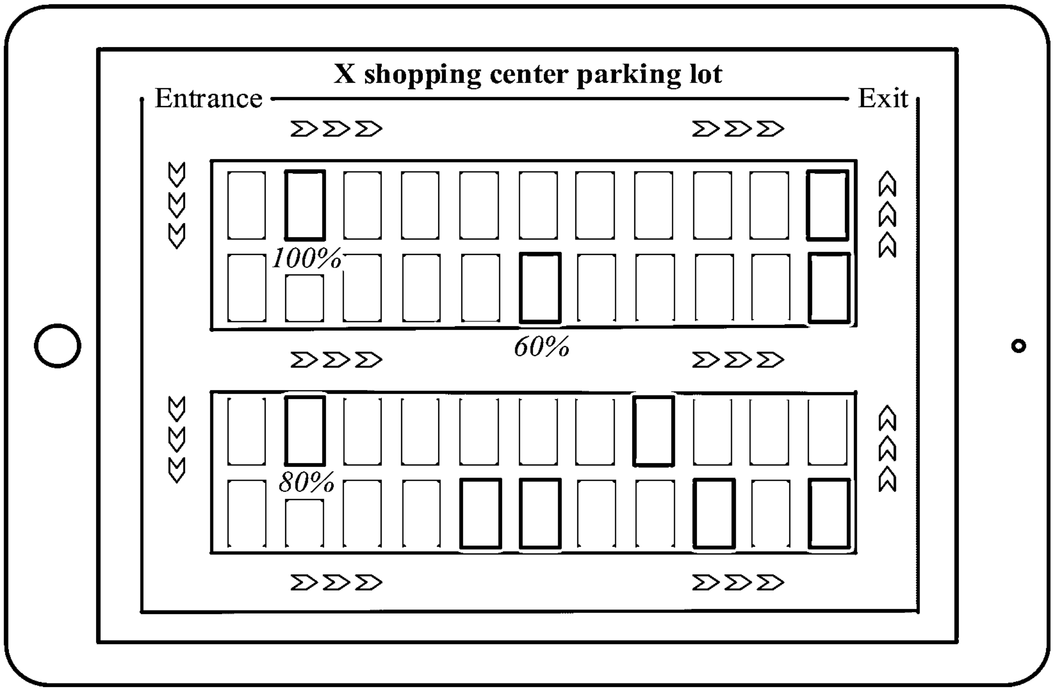
FIG. 25 is a schematic diagram of a third interface used to recommend a sun-protected parking space in an application according to an embodiment of this disclosure.
Figure 26:
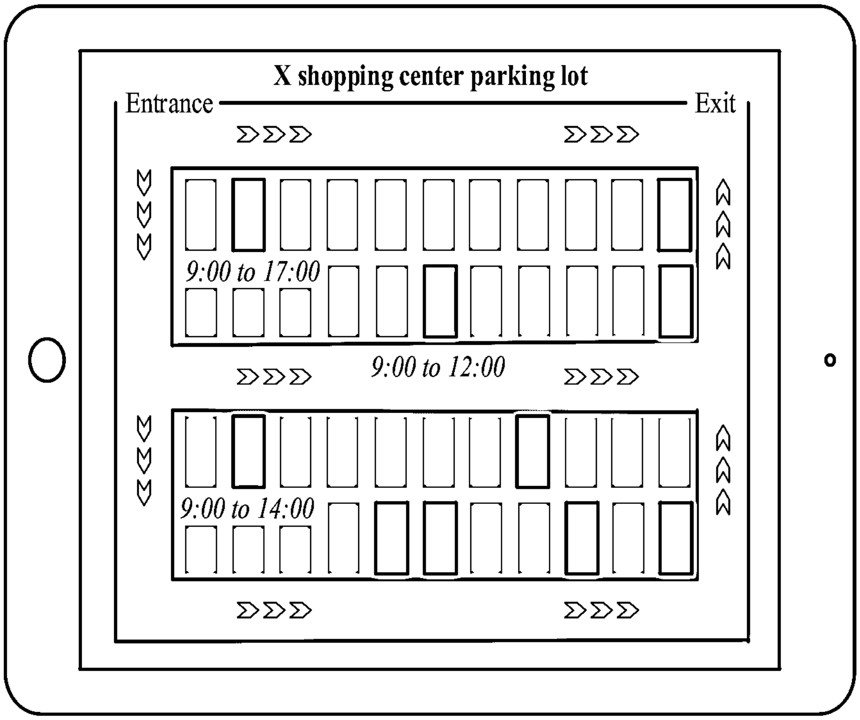
FIG. 26 is a schematic diagram of a fourth interface used to recommend a sun-protected parking space in an application according to an embodiment of this disclosure.

While a location of the parking space in the shadow is indicated to the user, shadow information about the parking space may be further displayed on the display interface. In FIG. 25, three rectangular patterns that are filled with dark gray and that are with a border indicate three recommended parking spaces in shadows, a percentage is marked below each parking space, and the percentage may indicate a plurality of types of shadow information. For example, the percentage may indicate a proportion of an area covered by the shadow of the parking space above the percentage at a current time. For another example, the percentage may indicate a percentage of duration in which the parking space above the percentage is in the shadow to parking duration of the user within a parking time period of the user. In FIG. 26, three rectangular patterns that are filled with dark gray and that are with a border indicate three recommended parking spaces in shadows, and a time period is also marked below each parking space to indicate the time period during which the parking space above the time period is in the shadow during daytime. By viewing the shadow information about the parking space from the display interface, the user can select a parking space more conveniently.

Figure 27:
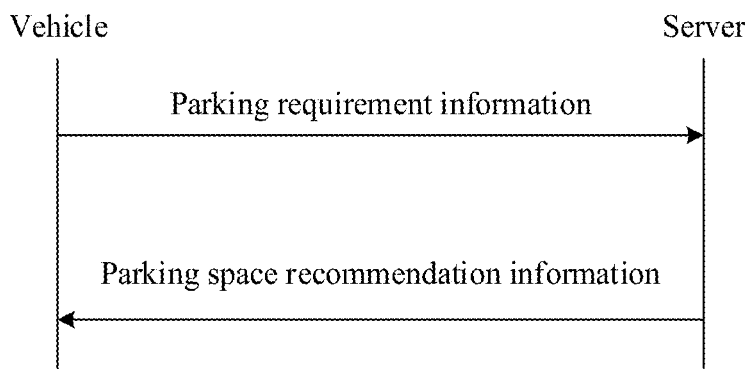
FIG. 27 is an interaction flowchart of applying shadow information to a parking space recommendation cloud service according to an embodiment of this disclosure.

For the other case, FIG. 27 is an example of an interaction flowchart in which a server provides a cloud service for a vehicle. It should be noted that a device that receives a parking space recommendation cloud service from the server is not limited to a vehicle, for example, may further be a terminal such as a mobile phone, a notebook computer, a navigator, a tablet computer, or an intelligent wearable device. An interaction process between the terminal and the server is similar to that in FIG. 27, and details are not described herein again.

In FIG. 27, a method for applying shadow information to a parking space recommendation cloud service includes the following steps.

Step 1: The vehicle sends parking requirement information to the server, where the parking requirement information indicates at least one of an estimated parking region, a parking start time, a parking end time, and parking duration.

Step 2: The server selects, based on shadow information in a map, at least one parking space that meets the parking requirement of the user indicated by the parking requirement information from the plurality of parking spaces, and sends parking space recommendation information to the vehicle to indicate the at least one parking space.

Figure 28:
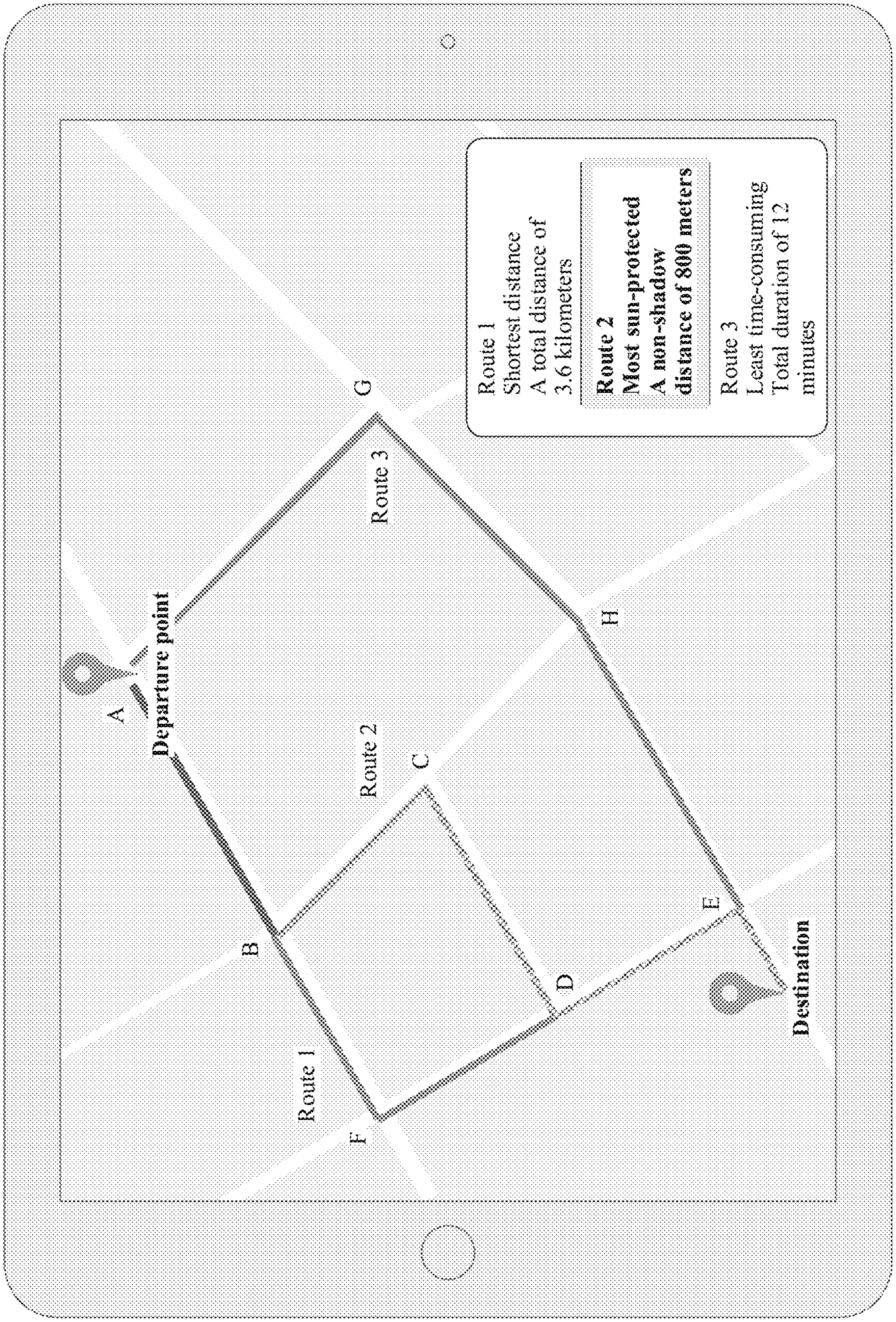
FIG. 28 is a schematic diagram of a display interface used to recommend a travel route in an application according to an embodiment of this disclosure.
Figure 29:
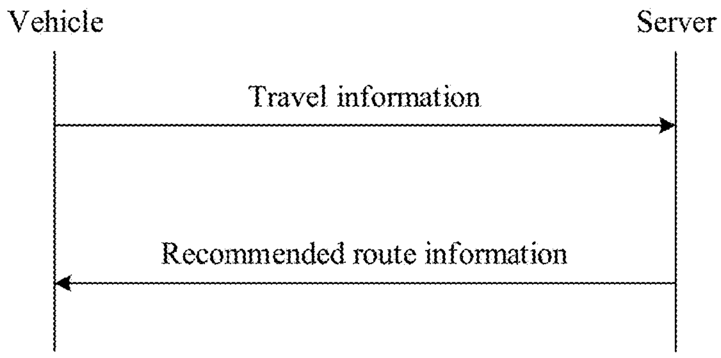
FIG. 29 is an interaction flowchart of applying shadow information to a travel route recommendation cloud service according to an embodiment of this disclosure.

The following describes a method for recommending a travel route based on shadow information with reference to FIG. 28 and FIG. 29.

Many people want to walk in a shadow as much as possible during summer or at noon to reduce sun exposure. In winter, many people may want to walk as much as possible on a sun-baked road. In addition to walking, people also have a need to choose whether to drive in shadow when driving. People may want a moving vehicle to be protected from the sun. For a driver, intense sunlight can tan a skin and even make the driver unable to see a road ahead. For a vehicle, sun exposure can raise a temperature inside the vehicle, energy consumption can be increased when an air conditioner is turned on, and long-term sun exposure can cause aging of components and can cause toxic gases to be released from an interior of the vehicle. People may also want the moving vehicle to be on a sun-baked road as much as possible, for example, when the vehicle is powered by solar energy.

An embodiment of this disclosure provides a method for recommending a travel route to a user based on shadow information. The method may be performed by a device in a terminal, a roadside, or a cloud, which includes but is not limited to a vehicle, a portable terminal, an RSU, an REC, a map server, or an application server. Alternatively, the method may be performed by an application installed on a device in a terminal, a roadside, or a cloud.

After the user enters a departure point and a destination, a navigation application may recommend a travel route to the user based on a travel strategy, such as a shortest distance, a shortest time, least red lights, most fuel efficient, or most toll-saving. A vehicle, a portable terminal, and a device installed on a roadside or on a cloud can use the shadow information to determine a most sun-protected travel route for the user in combination with the travel requirement (including but not limited to a departure point, a destination, a travel time or a travel mode) of the user by using the installed navigation application. The most sun-protected travel route may be a route with a longest length of a road section covered by a shadow region, or a route with a largest ratio of a length of a road section covered by a shadow region to a total length of a road, or a route with a shortest length of a road section covered by a non-shadow region, or a route with a smallest ratio of a length of a road section covered by a non-shadow region to a total length of a road. A specific calculation manner used to determine the most sun-protected travel route is not limited in this embodiment.

In a navigation display interface of FIG. 28, a plurality of travel policies under different policies are recommended to the user, and a rectangular box in a lower right corner describes each route in a text form: Route 1 via A-B-F-D-E is a route with a shortest travel distance, with a total distance of 3.6 kilometers, Route 2 via A-B-C-D-E is a most sun-protected route, with a non-shadow distance of 800 meters, and Route 3 via A-G-H-E is a least time-consuming route, with total duration of 12 minutes.

Optionally, a vehicle, a portable terminal, or a device installed on a roadside or a cloud may generate the shadow information, or may obtain the shadow information by receiving map data.

Optionally, when the shadow information includes time information used to indicate a time period in which the shadow region exists, a navigation application recommends, with reference to the time information and the travel time information of the user, a most sun-protected travel route to the user. As a result, the recommended most sun-protected travel route may be different at different times.

Optionally, the navigation application may further obtain a travel mode of the user, for example, walking, cycling, or driving, and recommend a travel route to the user based on the travel mode. For example, a sidewalk of a road section is a shadow region, but a non-motorized vehicle lane and a motor vehicle lane are non-shadow regions. Therefore, if the user travels on foot, a route including the road section may be recommended to the user, and if the user travels by cycling or driving, a route including the road section may not be recommended to the user.

When a terminal obtains a travel route based on a cloud service provided by a cloud, for example, the terminal is a vehicle, and the cloud is a server, FIG. 29 illustrates an interaction method, including the following steps.

Step 1: The vehicle sends travel information to the server, where the travel information includes at least one of a travel time, a travel mode (walking, cycling, or driving), a departure point, and a destination.

Step 2: The server determines a travel route based on shadow information and the travel information in a map, and recommends the travel route to the user in a form of sending recommended route information to the vehicle.

It should be noted that the travel route determined based on the shadow information and the travel information may also be a most sun-baked route in addition to the most sun-protected route in the foregoing example, for example, the most sun-baked route may be applied to a scenario such as a solar-powered vehicle.

Figure 30:
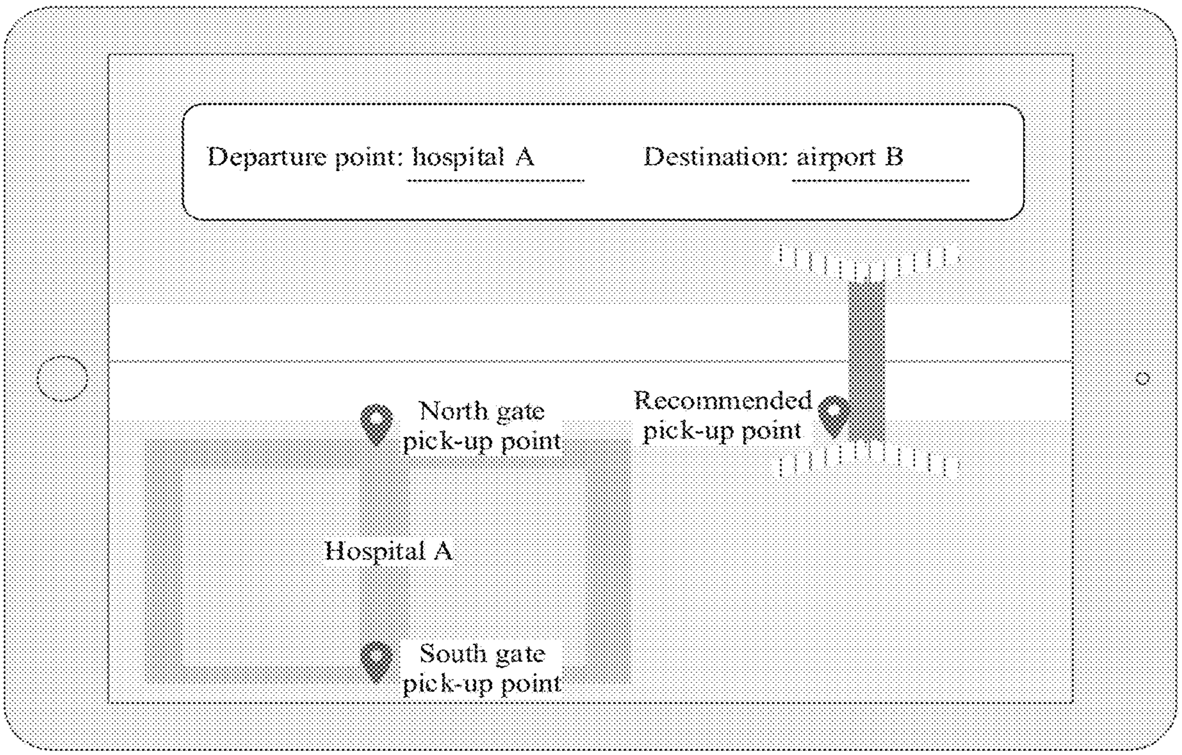
FIG. 30 is a schematic diagram of a display interface used to recommend a pick-up point in an application according to an embodiment of this disclosure.
Figure 31:
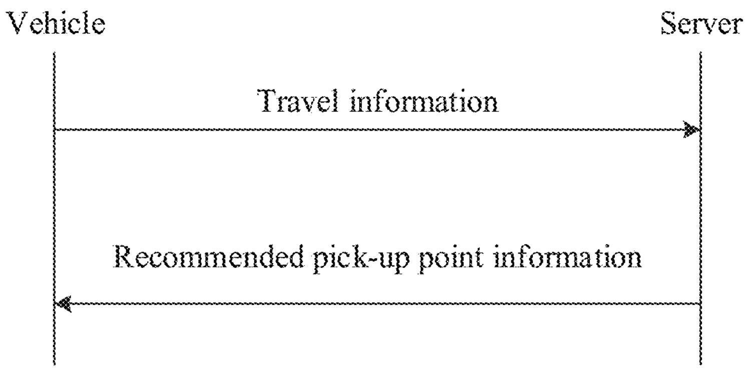
FIG. 31 is an interaction flowchart of applying shadow information to a pick-up point recommendation cloud service according to an embodiment of this disclosure.

The following describes a method for recommending a pick-up point or a drop-off point based on shadow information with reference to FIG. 30 and FIG. 31.

When an online car-hailing vehicle (manned driving or unmanned driving) comes to pick up a passenger, a pick-up point or a drop-off point is generally agreed with the passenger in advance. In the conventional technology, when a pick-up point or a drop-off point is determined, on the one hand, for convenience of the user, the user is made to walk as little as possible in combination with a wish of the user or a location of the user, and on the other hand, the pick-up point or the drop-off point is made to conform to provisions of policies and regulations in combination with map information, for example, an entrance of some units, an entrance of some residential regions, an entrance of some schools or bus stops are not suitable as the pick-up point or the drop-off point. However, in the conventional technology, a user experience requirement of the pick-up point or the drop-off point in different climate conditions is not considered, such as a requirement for a shadow region. For example, if the pick-up point is not in a shadow, the user may have a poor experience when waiting for the vehicle in summer or at noon. Therefore, this embodiment of this disclosure provides a method for recommending a pick-up point or a drop-off point based on shadow information.

The method may be performed by a device in a terminal, a roadside, or a cloud, which includes but is not limited to a vehicle, a portable terminal, an RSU, an REC, a map server, or an application server. Alternatively, the method may be performed by an application installed on a device in a terminal, a roadside, or a cloud, which includes but is not limited to a navigation application or an online car-hailing application.

The method for recommending a pick-up point based on shadow information includes the following steps of obtaining travel information of a user, where the travel information includes at least one of a travel time, a travel mode (walking, cycling, or driving), a departure point, and a destination, and the obtaining manner may be obtaining based on a user input, or generating based on data through calculation, or obtaining by invoking information in a program or module, or obtaining by receiving a message, which is not limited herein, determining, based on map information, at least one pick-up point in a shadow region near a departure point, where the map information includes the shadow information described above, and recommending the at least one pick-up point to the user, where the recommending manner includes but is not limited to displaying a text and/or a graphic on a user interface, or sending information used to indicate the at least one pick-up point.

In an example in which a pick-up point is recommended based on shadow information, FIG. 30 illustrates a display interface used for recommending a pick-up point in an application. A user wants to take a car from a hospital A to an airport B. In the display interface of an online car-hailing application, the user enters a departure point and a destination in text. The display interface displays a map near a current location of the user. A pick-up point at a north gate of the hospital and a pick-up point at a south gate of the hospital are marked on the display interface. Since neither of the two pick-up points is in a shadow region, the application recommends a pick-up point under an overpass that is 100 meters east of the north gate of the hospital and marks the recommended pick-up point at a corresponding location on the map.

When a terminal obtains a pick-up point based on a cloud service provided by a cloud, for example, the terminal is a vehicle, and the cloud is a server, FIG. 31 illustrates an interaction method, including the following steps.

Step 1: The vehicle sends travel information to the server, where the travel information includes at least one of a travel time, a travel mode (walking, cycling, or driving), a departure point, and a destination.

Step 2: The server determines, based on shadow information and the travel information in a map, a pick-up point located in a shadow region, and recommends the pick-up point to the user in a form of sending recommended pick-up point information to the vehicle.

A method for recommending a drop-off point based on shadow information is similar to the method for recommending a pick-up point, and details are not described herein again.

Figure 32A:
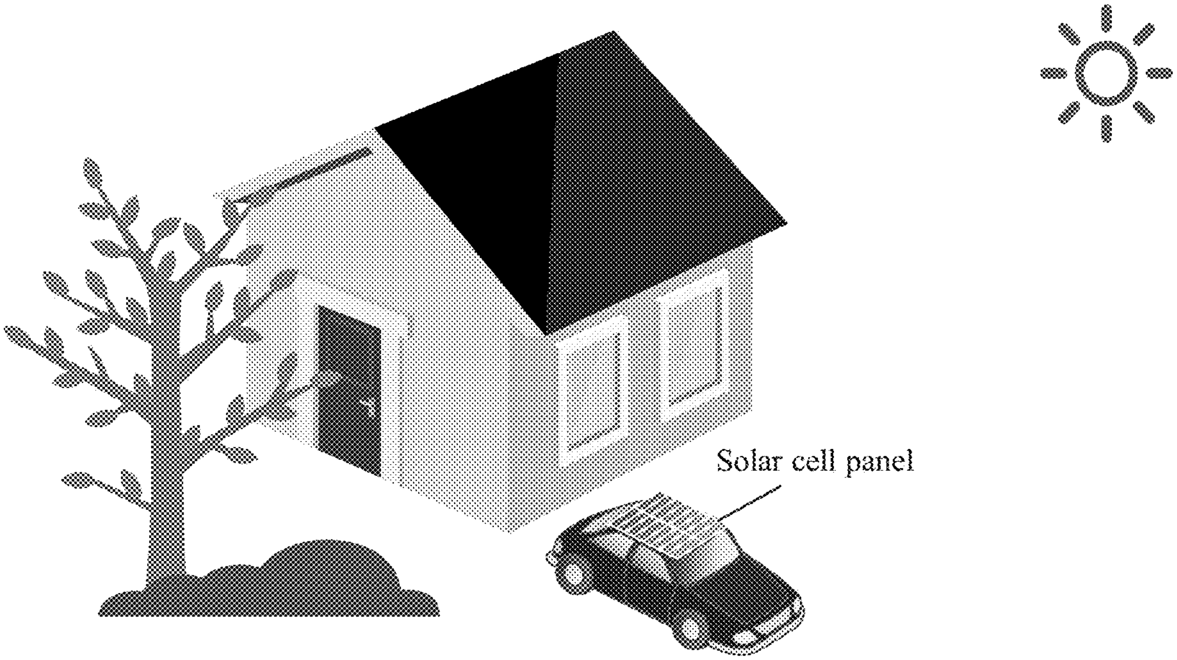
FIG. 32A is a schematic diagram of a first application scenario in which shadow information is applied to solar energy charging according to an embodiment of this disclosure.
Figure 32B:
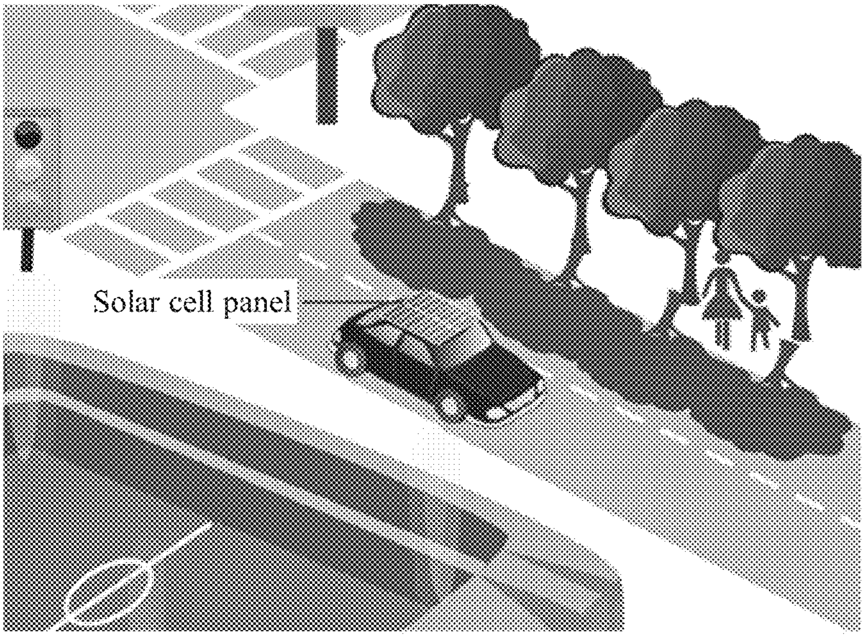
FIG. 32B is a schematic diagram of a second application scenario in which shadow information is applied to solar energy charging according to an embodiment of this disclosure.

A method for assisting solar energy charging based on shadow information is described below with reference to FIG. 32A, FIG. 32B, and FIG. 33.

As a kind of clean energy, solar energy has great application prospect. There are now vehicles powered by solar energy. The vehicle is equipped with a solar cell panel on a roof, which can provide energy for the vehicle or charge an on-board battery by collecting solar energy irradiated on the solar cell panel on the roof in a parking state (as shown in FIG. 32A) and a driving state (as shown in FIG. 32B). An embodiment of this disclosure provides a method for recommending a parking space or a driving route for a vehicle that uses solar energy as an energy source based on shadow information, so that the vehicle is exposed to sunlight as much as possible to meet an energy requirement of the vehicle.

The method may be performed by a device in a terminal, a roadside, or a cloud, which includes but is not limited to a vehicle, a portable terminal, an RSU, an REC, a map server, or an application server. Alternatively, the method may be performed by an application installed on a device in a terminal, a roadside, or a cloud.

The method includes the following steps.

First, requirement information of the vehicle is obtained, where the requirement information indicates an intention that the vehicle is to stop or travel. If it is determined that the vehicle is to stop, a region in which the vehicle is to be parked is further determined. The requirement information may further include information used to indicate the region in which the vehicle is to be parked. If it is determined that the vehicle is to travel, a departure location and a destination of the travel are further determined. The requirement information may further include information used to indicate the departure location and the destination. Further, when the shadow information includes time information used to indicate a time period in which the shadow region exists, a time at which the vehicle is to stop or travel may be further obtained, so that the shadow information corresponding to the time in a map may be used to assist solar energy charging.

Then, when the vehicle is about to stop, a parking location in a non-shadow region within the parking region is determined based on the map including the shadow information. When the vehicle is about to travel, a travel route from the departure location to the destination v map including the shadow information is determined, where the travel route is a route with a longest length of a road section covered by a shadow region, or a route with a largest ratio of a length of a road section covered by a shadow region to a total length of a road, or a route with a shortest length of a road section covered by a non-shadow region, or a route with a smallest ratio of a length of a road section covered by a non-shadow region to a total length of a road. A specific calculation manner used to determine a travel route is not limited in this embodiment. For example, when the vehicle is about to travel, one or more of other factors such as a driving distance, a congestion degree, highway preference, and a passing-through location may be further considered, and different weights may be assigned to different factors based on a requirement of the user, to determine a travel route.

Finally, the parking location or the travel route is recommended to the user of the vehicle, or an instruction of parking at the parking location or driving along the travel route is sent to the vehicle in a case of unmanned driving or assisted driving. When recommending the parking location or the travel route to the user, a recommending manner includes but is not limited to displaying a text and/or a graphic on a user interface, or sending information used to indicate the parking location or the travel route.

Figure 33:
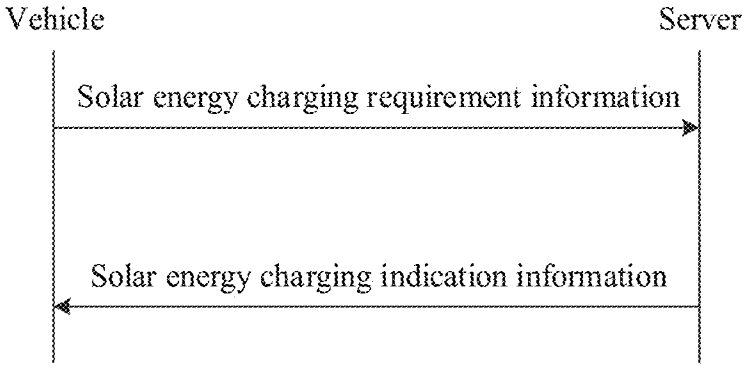
FIG. 33 is an interaction flowchart of applying shadow information to a solar energy charging cloud service according to an embodiment of this disclosure.

When a terminal obtains, based on a cloud service provided by a cloud, a parking location or a driving route used to supplement solar energy, for example, the terminal is a vehicle, and the cloud is a server, FIG. 33 illustrates an interaction method, including the following steps.

Step 1: The vehicle sends solar energy charging requirement information to the server, where the solar energy charging requirement information includes information used to indicate an intention that the vehicle is to stop or travel. Further, the solar energy charging requirement information further includes information used to indicate a parking region or information used to indicate a departure location and a destination of the travel. Further, the solar energy charging requirement information further includes information used to indicate a time at which the vehicle is to stop or travel.

Step 2: The server generates solar energy charging indication information based on the shadow information in a map and the solar energy charging requirement information, and sends the solar energy charging indication information to the vehicle, where the solar energy charging indication information indicates the parking location or the driving route.

The information in step 1 may be carried in a same message and sent to the server, or may be carried in different messages and sent to the server. This is not limited in embodiments of this disclosure.

Figure 34:
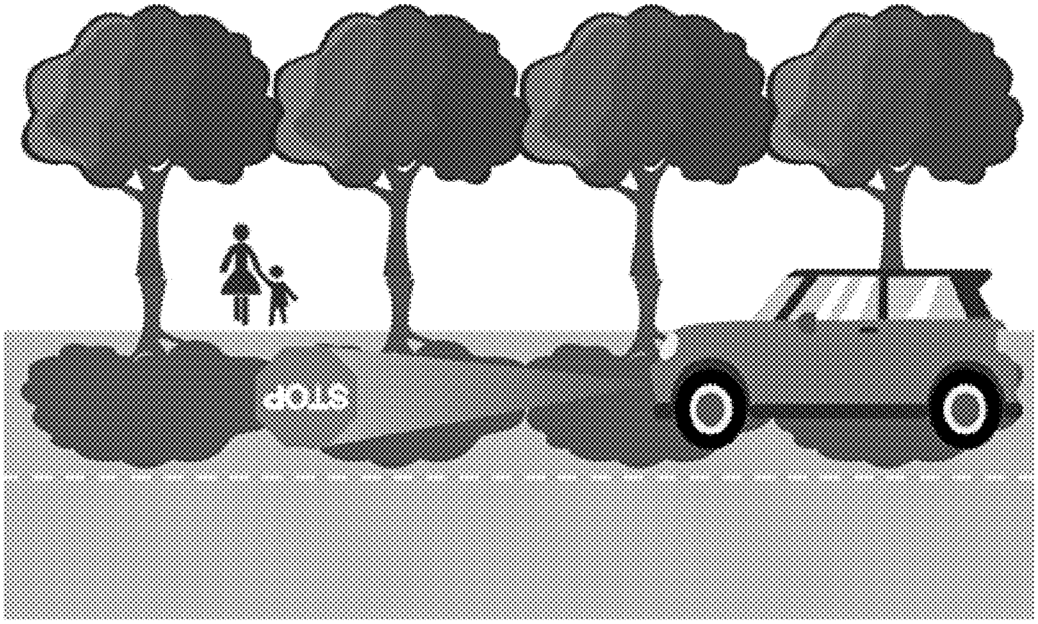
FIG. 34 is a schematic diagram of an application scenario in which shadow information is applied to laser projection according to an embodiment of this disclosure.

The following describes a method for assisting projection onto a road surface based on shadow information with reference to FIG. 34. A device used for projection is not limited in this embodiment of this disclosure. The following uses a vehicle as a projection device as an example for description. In addition, this embodiment of this disclosure is further applicable to a scenario in which a mobile phone or a dedicated projection device is used to perform projection. A specific method is similar to the method in which a vehicle is used for projection described below.

Laser projection may be applied to a traffic information reminder. A vehicle or a roadside device may project traffic information to a road surface or a side of a building in a form of a text and/or a pattern, to remind another traffic participant, or as a manner of interacting with another participant. An embodiment of this disclosure provides a method for assisting projection based on shadow information, to determine, based on the shadow information, at least one of a location, luminance, and a color that are used for laser projection, so that the laser projection more easily attracts attention of another traffic participant. Further, when the shadow information includes time information used to indicate a time period in which the shadow region exists, a time used for laser projection may be further determined based on the time information.

As shown in FIG. 34, a vehicle travels in a lane from right to left, and the vehicle learns, based on shadow information in a map, that the vehicle currently enters a shadow region on the lane. By using a sensing device disposed on the vehicle, the vehicle senses that two pedestrians stand on a roadside in front of the vehicle, and the vehicle determines that the two pedestrians may cross a road. This is a potential hazard factor. Therefore, when the vehicle determines that the two pedestrians are in a driving direction of the vehicle and a distance between the pedestrian and the vehicle meets a preset condition, the vehicle projects a warning projection pattern to a front road section. The warning projection pattern plays a warning role for the pedestrian, for example, the warning projection pattern may be "Stop" or "Attention". The projection pattern is located at a road surface projection location that is easily noticed by the two pedestrians to remind the two pedestrians that a vehicle is about to pass and not to cross the road. To improve a visual effect of laser projection, a projection apparatus of the vehicle obtains the shadow information on the map, and adjusts luminance or hue of the projection based on that the road surface projection location indicated by the shadow information is in a shadow region. In addition, when the road surface projection location that is easily noticed by the pedestrian and that is in front of the vehicle includes both a shadow region and a non-shadow region, the projection apparatus of the vehicle may adjust a projection distance or angle based on projection information in the map, so that the vehicle always projects the projection pattern to the shadow region in the road surface projection location during driving.

Figure 35:
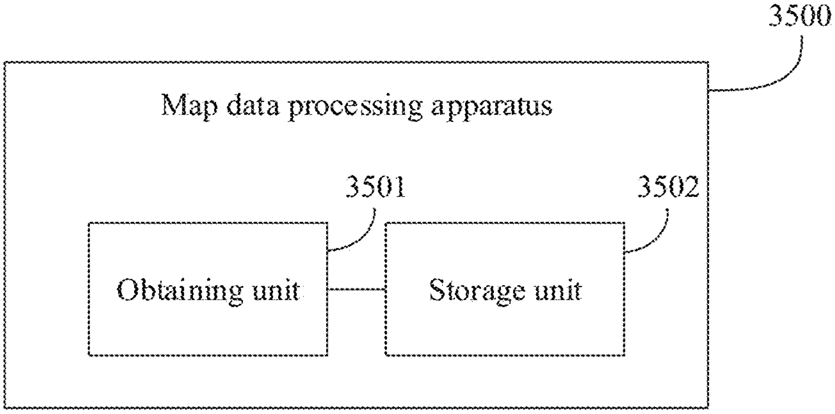
FIG. 35 is a block diagram of a structure of a map data processing apparatus according to an embodiment of this disclosure.

As shown in FIG. 35, an embodiment of this disclosure provides a map data processing apparatus 3500. The apparatus may be configured to perform the map data processing method according to any one of FIG. 4 to FIG. 12B. The map data processing apparatus 3500 includes an obtaining unit 3501 configured to obtain shadow information, where the shadow information indicates a shadow region, the shadow information includes location information, and the location information indicates a geographical location of the shadow region, and a storage unit 3502 configured to store the shadow information as map data.

For obtaining the shadow information, the shadow region, and the shadow information, and storing the shadow information, refer to the foregoing description. Details are not described herein again.

The map data processing apparatus 3500 may be located on a cloud, a roadside, or a terminal, and includes but is not limited to a device such as a map server, an application server, an RSU, an REC, a vehicle, or a portable terminal, or a component, a chip, a software module, or a hardware module inside these devices.

That the map data processing apparatus 3500 obtains shadow information may be that the map data processing apparatus 3500 generates the shadow information based on sensing information obtained by the map data processing apparatus 3500 or sensing information received from another apparatus. In this case, the map data processing apparatus 3500 serves as a map generation apparatus, and may provide a map product including the shadow information to a map use apparatus in the cloud, the roadside, or the terminal.

Alternatively, that the map data processing apparatus 3500 obtains shadow information may be the map data processing apparatus 3500 receives the shadow information from another apparatus. In this case, the map data processing apparatus 3500 serves as a map storage apparatus or a map use apparatus, and maintains a map database including the shadow information.

Figure 36:
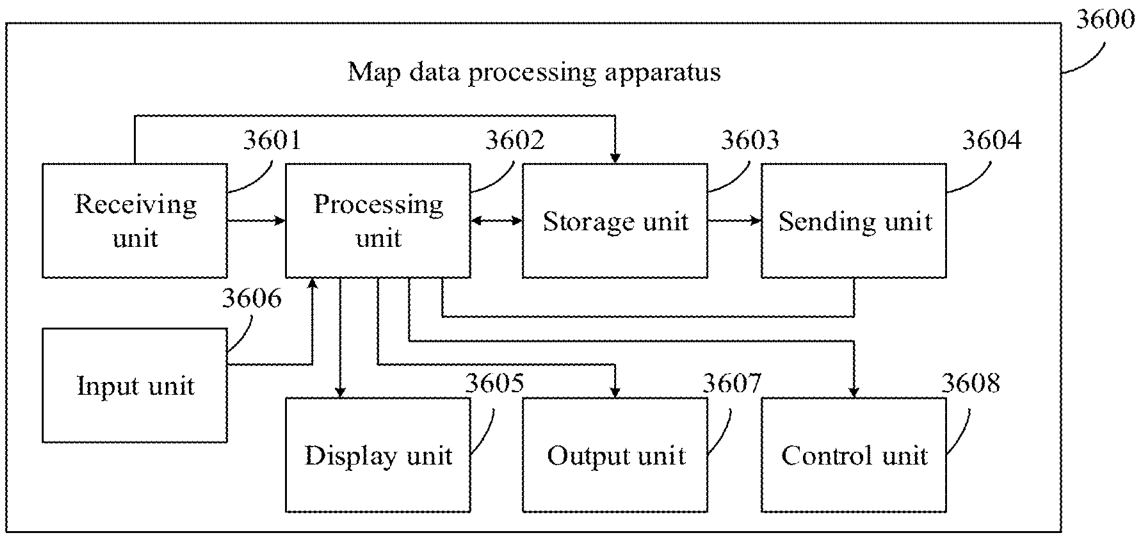
FIG. 36 is a block diagram of a structure of a map data processing apparatus according to an embodiment of this disclosure.

As shown in FIG. 36, an embodiment of this disclosure provides a map data processing apparatus 3600. The apparatus may be configured to perform the map data processing method according to any one of FIG. 4 to FIG. 12B. The map data processing apparatus 3600 includes at least one of a receiving unit 3601, a processing unit 3602, a storage unit 3603, a sending unit 3604, a display unit 3605, an input unit 3606, an output unit 3607, and a control unit 3608.

The storage unit 3603 is configured to store shadow information described above as map data.

In one case, the shadow information stored in the storage unit 3603 comes from the shadow information generated by the processing unit 3602. In this case, the map data processing apparatus 3600 may serve as a map generation apparatus, and is configured to provide a map product including the shadow information to a map use apparatus on a cloud, a roadside, or a terminal.

The processing unit 3602 may be further configured to generate the shadow information by collecting statistics on sensing data obtained by a map collection vehicle, a crowdsourcing vehicle, or a roadside device with reference to other information such as a weather condition.

Optionally, the processing unit 3602 is configured to determine a display region of the shadow region on a display interface based on location information in the shadow information and boundary information of a map element in the map.

Optionally, the processing unit 3602 is configured to identify a target object based on the sensing data and the shadow information, for example, identify a category of the target object, a name of the target object, an outline of the target object, a color of the target object, a pattern of the target object, or whether the target object is stereoscopic.

Optionally, the processing unit 3602 is configured to make a driving decision based on a result of identifying the target object.

Optionally, the processing unit 3602 is configured to determine, based on driving data and the shadow information, that the vehicle is to about enter the shadow region within a time less than a first threshold, or that a distance between the vehicle and a shadow region in front of a driving direction of the vehicle is less than a second threshold.

Optionally, the processing unit 3602 is configured to select at least one parking space based on parking requirement information and the shadow information.

Optionally, the processing unit 3602 is configured to obtain the parking requirement information of a user based on navigation information.

Optionally, the processing unit 3602 is configured to plan a travel route, a pick-up point, or a drop-off point for the user based on the travel information and the shadow information.

Optionally, the processing unit 3602 is configured to determine, based on solar energy charging requirement information and the shadow information, a first location used for charging in a stationary state or a first route for charging in a moving state.

Optionally, the processing unit 3602 is configured to determine, based on the shadow information, at least one of a location, luminance, and hue used for laser projection.

In another case, the shadow information stored in the storage unit 3603 comes from the shadow information received by the receiving unit 3601. In this case, the map data processing apparatus 3600 may serve as a map storage apparatus or a map use apparatus, and maintains a map database including the shadow information.

The receiving unit 3601 is configured to receive the shadow information from another device, component, chip, interface, hardware module, or software module.

Optionally, the receiving unit 3601 is further configured to receive sensing data about a target object, driving data of the vehicle, parking requirement information of the user, travel information of the user, or solar energy charging requirement information of the user.

Regardless of either of the foregoing two cases, the map data processing apparatus 3600 may optionally include the sending unit 3604, which is configured to send the shadow information.

Optionally, the sending unit 3604 is further configured to send target indication information to the vehicle, where the target indication information indicates an attribute of the target object. For example, the attribute includes a category of the target object, a name of the target object, an outline of the target object, a color of the target object, a pattern of the target object, or whether the target object is stereoscopic.

Optionally, the sending unit 3604 is further configured to send a reminder message to the vehicle, where the reminder message indicates that the vehicle is about to enter the shadow region.

Optionally, the sending unit 3604 is further configured to send parking space recommendation information to a mobile terminal, where the parking space recommendation information indicates at least one parking space. The mobile terminal includes but is not limited to a vehicle or a portable terminal (such as a mobile phone, a notebook computer, a tablet computer, a navigator, or a smart wearable device).

Optionally, the sending unit 3604 is further configured to send travel suggestion information to the mobile terminal, where the travel suggestion information indicates a travel route, a pick-up point, or a drop-off point.

Optionally, the sending unit 3604 is further configured to send solar energy charging indication information to the mobile terminal, where the solar energy charging indication information indicates a first location or a first route.

Regardless of either of the foregoing two cases, the map data processing apparatus 3600 may optionally include the display unit 3605, which is configured to display the shadow region based on the shadow information. Alternatively, further, the display unit 3605 is configured to superimpose, based on a shadow display trigger instruction, the shadow information on other information of the map for display. Alternatively, further, the display unit 3605 is configured to display, based on the time information in the shadow information, a change of the shadow region with time. Alternatively, further, the display unit 3605 is configured to display shadow degree information in the shadow information by using different grayscales, colors, saturation, or pattern densities. Alternatively, further, the display unit 3605 is configured to display reason information in the shadow information by using different grayscales, colors, saturation, or pattern densities. Alternatively, further, the display unit 3605 is configured to display the shadow region on a display region determined by the processing unit. Alternatively, further, the display unit 3605 is configured to recommend the parking space to the user on a display interface. Alternatively, further, the display unit 3605 is configured to recommend the travel route to the user on the display interface. Alternatively, the display unit 3605 is configured to recommend, on the display interface, the first location or the first route used for solar energy charging to the user.

Regardless of either of the foregoing two cases, the map data processing apparatus 3600 may optionally include the input unit 3606, which is configured to receive the shadow display trigger instruction entered by the user, or enable the user to input the parking requirement information.

Regardless of which of the foregoing two cases, the map data processing apparatus 3600 may optionally include the output unit 3607, which is configured to remind the user to perform at least one of decelerating, turning on a headlight, turning on a warning light, and honking a horn.

Regardless of either of the foregoing two cases, the map data processing apparatus 3600 may optionally include the control unit 3608, which is configured to control the vehicle perform at least one of decelerating, turning on a headlight, turning on a warning light, and honking a horn.

One or more units in the embodiments shown in FIG. 35 and FIG. 36 may be implemented by using software, hardware, firmware, or a combination thereof. The software or firmware includes but is not limited to computer program instructions or code, and may be executed by a hardware processor. The hardware includes but is not limited to various integrated circuits, such as a central processing unit (CPU), a digital signal processor (DSP), a field-programmable gate array (FPGA), or an application-specific integrated circuit (ASIC).

Figure 37:
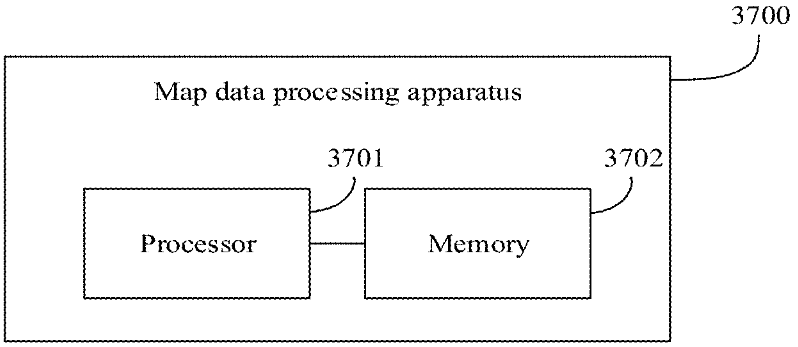
FIG. 37 is a block diagram of a structure of a map data processing apparatus according to an embodiment of this disclosure.

As shown in FIG. 37, an embodiment of this disclosure provides a map data processing apparatus 3700, including a processor 3701 and a memory 3702. The memory 3702 stores computer program instructions, and the processor 3701 reads the computer program instructions from the memory and runs the computer program instructions, so that the map data processing apparatus 3700 performs the map data processing method according to any one of FIG. 4 to FIG. 12B.

Figure 38:
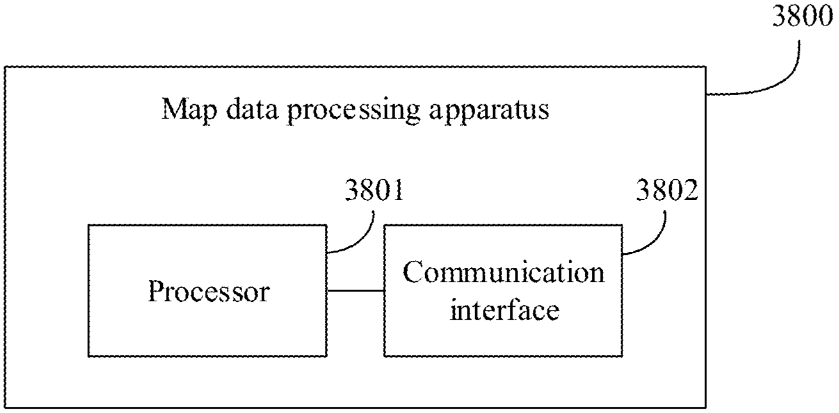
FIG. 38 is a block diagram of a structure of a map data processing apparatus according to an embodiment of this disclosure.

As shown in FIG. 38, an embodiment of this disclosure provides a map data processing apparatus 3800, including a processor 3801 and a communication interface 3802. The processor 3801 obtains computer program instructions through the communication interface 3802, and the processor 3801 runs the computer program instructions, so that the map data processing apparatus 3800 performs the map data processing method according to any one of FIG. 4 to FIG. 12B.

It should be understood that the processor 3701 or the processor 3801 may be a chip. For example, the processor 3701 or the processor 3801 may be an FPGA, an ASIC, a system on chip (SoC), a CPU, a network processor (NP), a DSP, a micro controller unit (MCU), a programmable logic device (PLD), or another integrated chip.

It may be understood that the memory 3702 in embodiments of this disclosure may be a volatile memory or a non-volatile memory, or may include a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM) that is used as an external cache. Through example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct Rambus (DR) RAM. It should be noted that, the memory of the systems and methods described in this specification includes but is not limited to these and any other memories of appropriate types.

A person skilled in the art may clearly understand that, descriptions of embodiments provided in this disclosure may be mutually referenced. For ease and brevity of description, for example, for functions of the apparatuses and devices and performed steps that are provided in embodiments of this disclosure, refer to related descriptions in method embodiments of this disclosure. Reference can also be made between various method embodiments and between various apparatus embodiments.

A person skilled in the art may understand that all or some of the steps of the method embodiments may be implemented by a program instructing related hardware. The program may be stored in a computer-readable storage medium. When the program is executed, all or some of the steps of the method embodiments are performed. The foregoing storage medium includes various media that can store program code, such as a ROM, a RAM, a magnetic disk, or an optical disc.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer program instructions are loaded and executed on a computer, the procedure or functions according to embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk drive, or a magnetic tape), an optical medium (for example, a DIGITAL VERSATILE DISC (DVD)), a semiconductor medium (for example, a solid-state drive (SSD)), or the like.

In the several embodiments provided in this disclosure, it should be understood that the disclosed system, apparatus, and method may be implemented in other manners without departing from the scope of this disclosure. For example, the described embodiments are merely examples. For example, division into the modules or units is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments without creative efforts.

In addition, the schematic diagrams illustrating the system, apparatus, method, and different embodiments may be combined or integrated with other systems, modules, technologies or methods without departing from the scope of this disclosure. In addition, the displayed or discussed mutual couplings or direct couplings or communication connections may be implemented through some interfaces. The indirect couplings or communications connections between the apparatuses or units may be implemented in electrical, mechanical, or other forms.

The foregoing descriptions are merely specific embodiments of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:

obtaining shadow information that indicates a shadow region of a location and that comprises location information, wherein the location information indicates a geographical location of the shadow region on a map, and wherein the shadow region is a surface region whose intensity of receiving light is weaker than that of a surrounding non-shadow region;

storing the shadow information as map data; and dynamically displaying, on the map, a change in shape of the shadow region with time over a predefined time period, wherein a playback progress of the change of the shadow region is controlled by a user of the map.

2. The method of claim 1, further comprising generating the shadow information.

3. The method of claim 1, wherein the shadow information further comprises at least one of:

geometric information indicating the shape of the shadow region or a size of the shadow region;

time information indicating a time period in which the shadow region exists; or shadow degree information indicating a shadow degree of the shadow region.

4. The method of claim 1, wherein storing the shadow information comprises storing the shadow information in a data structure for storing an event in the map.

5. The method of claim 1, further comprising sending the shadow information.

6. The method of claim 1, further comprising displaying the shadow region based on the shadow information.

7. The method of claim 6, further comprising:

receiving a shadow display trigger instruction from the user; and superimposing, based on the shadow display trigger instruction, the shadow information on other information of the map for display.

8. The method of claim 6, wherein a first display region on a display interface corresponding to the shadow region has a different grayscale relative to a second display region on the display interface, a different color relative to the second display region, a different saturation relative to the second display region, or a different superimposed pattern relative to the second display region.

9. The method of claim 6, wherein the shadow information further comprises time information indicating a time period in which the shadow region exists, and wherein displaying the shadow region comprises displaying the change of the shadow region based on the time information.

10. The method of claim 1, further comprising:

obtaining travel information of the user; and planning a travel route or a pick-up location for the user based on the travel information and the shadow information.

11. An apparatus comprising:

a memory configured to store instructions; and a processor coupled to the memory and configured to execute the instructions to cause the apparatus to:

obtain shadow information that indicates a shadow region of a location and that comprises location information, wherein the location information indicates a geographical location of the shadow region on a map, and wherein the shadow region is a surface region whose intensity of receiving light is weaker than that of a surrounding non-shadow region;

store the shadow information as map data; and dynamically display, on the map, a change in shape of the shadow region over a predefined time period, wherein a playback progress of the change of the shadow region is controlled by a user of the map.

12. The apparatus of claim 11, wherein the processor is further configured to execute the instructions to cause the apparatus to:

obtain travel information of the user; and plan a travel route or a pick-up location for the user based on the travel information and the shadow information.

13. The apparatus of claim 11, wherein the processor is further configured to execute the instructions to cause the apparatus to receive the shadow information.

14. The apparatus of claim 11, wherein the shadow information further comprises at least one of:

shadow degree information indicating a shadow degree of the shadow region;

confidence level information indicating a reliability degree of the shadow region; or cause information indicating a cause of generating the shadow region.

15. The apparatus of claim 11, wherein the processor is further configured to execute the instructions to cause the apparatus to further store the shadow information in a data structure for storing an event in the map.

16. The apparatus of claim 11, wherein the processor is further configured to execute the instructions to cause the apparatus to send the shadow information.

17. The apparatus of claim 11, wherein the processor is further configured to execute the instructions to cause the apparatus to display the shadow region based on the shadow information.

18. The apparatus of claim 17, wherein the processor is further configured to execute the instructions to cause the apparatus to:

receive a shadow display trigger instruction from the user; and superimpose the shadow information on other information of the map for display based on the shadow display trigger instruction.

19. The apparatus of claim 17, wherein a first display region on a display interface corresponding to the shadow region has a different grayscale relative to a second display region on the display interface, a different color relative to the second display region, a different saturation relative to the second display region, or a different superimposed pattern relative to the second display region, wherein the shadow information further comprises time information indicating a time period in which the shadow region exists, and wherein the processor is further configured to execute the instructions to cause the apparatus to display the change of the shadow region based on the time information.

20. A non-transitory computer-readable medium comprising computer-executable instructions and that, when executed by a processor, cause an apparatus to:

obtain shadow information that indicates a shadow region of a location and that comprises location information, wherein the location information indicates a geographical location of the shadow region on a map, and wherein the shadow region is a surface region whose intensity of receiving light is weaker than that of a surrounding non-shadow region;

store the shadow information as map data; and dynamically display, on the map, a change in shape of the shadow region over a predefined time period, wherein a playback progress of the change of the shadow region is controlled by a user of the map.

* * * * *